(12) United States Patent
Kobata et al.

(10) Patent No.: US 7,252,887 B2
(45) Date of Patent: *Aug. 7, 2007

(54) INTERLAYER FILM FOR LAMINATED GLASS AND LAMINATED GLASS

(75) Inventors: Shinnen Kobata, Koka-gun (JP);
Yoshio Aoshima, Koka-gun (JP);
Hajime Shohi, Koka-gun (JP)

(73) Assignee: Sekisui Chemical Co., Ltd., Osaka (JP)

(*) Notice: Subject to any disclaimer, the term of this patent is extended or adjusted under 35 U.S.C. 154(b) by 127 days.

This patent is subject to a terminal disclaimer.

(21) Appl. No.: 10/689,619

(22) Filed: Oct. 22, 2003

(65) Prior Publication Data

US 2005/0181220 A1 Aug. 18, 2005

Related U.S. Application Data

(62) Division of application No. 10/088,919, filed as application No. PCT/JP00/04565 on Jul. 6, 2000, now Pat. No. 6,673,456.

(30) Foreign Application Priority Data

Oct. 1, 1999 (JP) .............................. 1999-281573
Nov. 12, 1999 (JP) .............................. 1999-322791
Feb. 17, 2000 (JP) .............................. 2000-39826

(51) Int. Cl.
*B32B 17/16* (2006.01)
*G11B 11/105* (2006.01)

(52) U.S. Cl. ...................... 428/432; 428/437; 428/332; 428/339; 428/323

(58) Field of Classification Search ................ 428/426, 428/432, 46, 437, 332, 339, 323
See application file for complete search history.

(56) References Cited

U.S. PATENT DOCUMENTS

| | | | | |
|---|---|---|---|---|
| 3,354,025 A | | 11/1967 | Aykanian et al. ........... 161/199 |
| 3,380,294 A | * | 4/1968 | Redmond ...................... 73/82 |
| 4,020,217 A | | 4/1977 | Karasudani et al. ......... 428/429 |
| 5,504,133 A | | 4/1996 | Murouchi et al. ........... 524/430 |
| 5,518,810 A | | 5/1996 | Nishihara et al. ............ 428/328 |
| 5,830,568 A | | 11/1998 | Kondo ........................ 428/328 |
| 6,107,360 A | * | 8/2000 | Kaneko et al. ................ 522/81 |
| 6,387,516 B2 | * | 5/2002 | Shichiri et al. .............. 428/437 |

FOREIGN PATENT DOCUMENTS

| | | |
|---|---|---|
| EP | 0 727 306 | 8/1996 |
| JP | 55-29950 | 8/1980 |
| JP | 64-036442 | 2/1989 |
| JP | 57-106543 | 7/1992 |
| JP | 5-339033 | 12/1993 |
| JP | 07-070481 | 3/1995 |
| JP | 7-232937 | 9/1995 |
| JP | 8-102227 | 4/1996 |
| JP | 8-119687 | 5/1996 |
| JP | 8-217500 | 8/1996 |
| JP | 08-259279 | 10/1996 |
| JP | 8-337446 | 12/1996 |
| JP | 9-315841 | 12/1997 |
| JP | 11-171604 | 6/1999 |
| WO | 01/19748 | 3/2001 |
| WO | 01/42158 | 6/2001 |

* cited by examiner

*Primary Examiner*—Jennifer McNeil
*Assistant Examiner*—G. Blackwell
(74) *Attorney, Agent, or Firm*—Wenderoth, Lind & Ponack, L.L.P.

(57) ABSTRACT

The object of the present invention is to provide an interlayer film for laminated glass which exerts excellent heat insulation or electromagnetic wave transmittance and which is suitable for producing a laminated glass having excellent fundamental performance characteristics required for the laminated glass, such as transparency, especially good haze, appropriate bond strength between an interlayer film and glass, penetration resistance, impact absorption, weather resistance, and so on. Also, the object of the present invention is to provide a laminated glass produced by using the above-mentioned interlayer film.

These objects are realized by the interlayer film for laminated glass comprising an adhesive resin, wherein the average particle diameter of tin-doped indium oxide and/or antimony-doped tin oxide is ranging from 0 to 80 nm, and the number of the tin-doped indium oxide or antimony-doped tin oxide particles with a particle diameter of not less than 100 nm are dispersed not more than 1 per 1 $\mu m^2$, and also, by a laminated glass produced by interposing said interlayer film for laminated glass between at least a pair of glass sheets having a visible light transmittance rate (Tv) of not less than 65% in the light rays of 380 to 780 nm, a solar radiation transmittance rate (Ts) in the light rays of 300 to 2500 nm of not more than 80% of the mentioned visible light transmittance rate (Tv), the haze value (H) of up to 1.0% and electromagnetic wave shield (ΔdB) of not more than 10 dB in the wavelength of 10 to 2000 MHz.

28 Claims, No Drawings

INTERLAYER FILM FOR LAMINATED GLASS AND LAMINATED GLASS

This application is a divisional application of Ser. No. 10/088,919, filed Jul. 10, 2002 now U.S. Pat. No. 6,673,456, which is a U.S. national stage of International Application No. PCT/JP00/04565 filed Jul. 6, 2000.

TECHNICAL FIELD

The present invention relates to an interlayer film for laminated glass, which has excellent transparency, heat insulation, weather resistance and electromagnetic wave transmittance and excellent bond strength with the glass, and shows a much decreased extent of blushing by absorbing moisture. Also, the present invention relates to a laminated glass produced by using said interlayer film.

BACKGROUND ART

So far, a laminated glass has been widely used as the automotive windshields or side-glasses, or architectural window glasses, or the like. As the representative of above-mentioned glass, there can be mentioned, a laminated glass produced by interposing an interlayer film for laminated glass between at least two transparent glass sheets to integrate them. Said interlayer film consists of plasticized polyvinylacetal resin such as polyvinylbutyral resin.

While laminated glass of this kind tends to break due to a shock, the interlayer film interposed between glass sheets will not easily break, and the glass will keep adhering to the interlayer film even after breakage. Thus the risks for scattering debris of broken glasses are so low that it will prevent people in automobiles or buildings from being injured by the debris of broken glasses.

Although a laminated glass has the excellent functions described above, generally there is a problem of being inferior in heat insulation.

Among the rays, the infrared ray having a wavelength of not less than 780 nm has small amount of energy of about 10% compared to the ultraviolet ray, but has great thermal effect, and also the infrared ray is absorbed into the substances increasing temperature by releasing from the substances as heat, so the infrared ray is referred as heat ray.

Thus, cutting-off the infrared ray (heat ray) from the automotive windshields or side-glasses, or architectural window glasses, that is, increasing heat insulation of the automotive windshields or side-glasses, or architectural window glasses may suppress increase in temperature in automobiles or buildings. As the insulated glass, for example, a heat ray cut-off glass can be commercially obtained.

The above-mentioned heat ray cut-off glass is the glass sheet coated with multi-layers of metal/metallic oxide by means of metal deposition or sputtering to insulate direct sunlight. However, since the multi-layer coating is poor in scratch from outside and inferior in chemical-resistance, it was necessary to laminate interlayers composed of, for example, plasticized polyvinylbutyral resin, or the like to give a laminated glass.

However, the heat ray cut-off glass laminated interlayers is composed of, for example, plasticized polyvinylbutyral resin or the like had some problems following below:

(a) it was expensive;
(b) the multi-layer coating was thick, so its transparency (visible light transmittance rate) was low;
(c) the low bond strength between multi-layer coating and interlayer film resulted in exfoliation or blushing of interlayer; and
(d) it inhibited electromagnetic wave from transmitting into automobiles or buildings, causing troubles with communicating facilities such as a cellular phone, a car navigation system, an automatic garage opener, an automated teller machine and the like.

There are several proposals to solve the problems described above. For example, a laminated glass produced by laminating metal-deposited polyester films between plasticized polyvinylbutyral resin sheets is disclosed in Japanese Patent Publication for Opposition 52093/1986, Japanese Patent Publication for Laid-Open 36442/1989, and so on.

However, the laminated glass has some problems in the bond strength between plasticized polyvinylbutyral resin sheet and polyester film, thus not only the exfoliation will occur on the interface of the laminated glass with a lapse of time, but also electromagnetic wave transmittance is not enough.

Moreover, a laminated glass produced by dispersing fine particles of heat insulating mineral materials into interlayer film for the purpose of giving heat insulation is proposed in (for example, Japanese Patent Publication for Laid-Open 259279/1996, and so on). It is expected that the heat insulation can be increased by inhibiting increase in temperature in automobiles or buildings with the blockage of the infrared ray by using these functional fine particles.

In kneading functional fine particles such as metal or metallic oxide into an interlayer film, deterioration of haze in a laminated glass is the problem. This deterioration of haze strongly depends on the particle diameter of metal or metallic oxide contained in an interlayer film, the bigger the particle diameter is, the greater the haze value is. The same problem occurs in kneading functional fine particles, thus a technique regulating the particle diameter of the primary particle is introduced (Japanese Patent No. 2715859).

However, in an interlayer film, no matter how much the particle diameter of the primary particle or particle diameter in the dispersion may be regulated, melt-kneading with an adhesive resin under heat in the preparation of film results in recohesion between the particles. As the result, the particle diameter of the functional fine particle is bigger than that of the primary particle or in the dispersion. That is, in the interlayer film, desirable is regulating not only the particle diameter of the primary particle or the particle diameter in the dispersion, but also the particle diameter of the functional fine particle in the film.

Since the penetration resistance is required for a laminated glass represented by a laminated glass for automobiles, only good haze is not enough to produce a laminated glass, and appropriately adjusting the bond strength with glass is needed. A dispersant is necessary to disperse uniformly fine particles such as metal, metallic oxide and the like in an interlayer film. However, the dispersant influences on the bond strength, and so the necessary bond strength may not be obtained. That is, there were problems that the dispersant used for dispersing fine particles in a plasticizer influences on bond strength between the glass and the interlayer film, causing exfoliation or reducing penetration resistance, and moreover, the bond strength may change with a lapse of time by bleeding of the dispersant.

DISCLOSURE OF INVENTION

Taking the above-mentioned problems into consideration, the objective of the present invention is to provide an interlayer film for laminated glass, which exerts excellent heat insulation and electromagnetic wave transmittance, and which has good transparency, especially good haze and excellent fundamental performance characteristics required for a laminated glass, for example, appropriate bond strength between the glass and the interlayer film, penetration resistance, shock absorption, weather resistance, and so on, and also to provide a laminated glass produced by using the said interlayer film.

Another objective of the present invention is to provide an interlayer film for laminated glass, which is low in production cost and possible to adjust bond strength, and to provide a laminated glass produced by using the said interlayer film.

Thus, the present invention relates to:

(1) An interlayer film for laminated glass comprising an adhesive resin, which is characterized by that tin-doped indium oxide and/or antimony-doped tin oxide with the average particle diameter ranging 0 to 80 nm is dispersed in the adhesive resin, (2) An interlayer film for laminated glass as described in (1) above, which is characterized by that the number of tin-doped indium oxide or antimony-doped tin oxide particle with a particle diameter of not less than 100 nm is not more than 1 per 1 $\mu m^2$, (3) An interlayer film for laminated glass as described in (1) or (2) above, which is characterized by that a laminated glass made by interposing the interlayer film for laminated glass between two clear glass sheets, each glass sheet having thickness of 2.5 mm, has a visible light transmittance rate (Tv) of not less than 70% in the light rays of 380 to 780 nm, a solar radiation transmittance rate (Ts) in the light rays of 300 to 2500 nm of not more than 80% of above-mentioned visible light transmittance rate (Tv) and the haze value (H) of not more than 1.0%, (4) An interlayer film for laminated glass as described in (1) to (3) above, wherein an adhesive resin contains a plasticizer, (5) An interlayer film for laminated glass as described in (4) above, wherein 30 to 60 parts by weight of the plasticizer, 0.1 to 3.0 parts by weight of tin-doped indium oxide and/or antimony-doped tin oxide are contained per 100 parts by weight of the adhesive resin, (6) An interlayer film for laminated glass as described in (1) to (5) above, wherein the adhesive resin is polyvinylacetal resin, (7) An interlayer film for laminated glass as described in (1) to (6) above, which additionally comprises at least one dispersant selected from the group consisting of;
(a) a chelating agent,
(b) a compound with at least one carboxyl group at its terminal position, and
(c) a modified silicone oil, (8) An interlayer film for laminated glass, which comprises an adhesive resin containing tin-doped indium oxide and/or antimony-doped tin oxide particle and at least one dispersant selected from the group consisting of;
(a) a chelating agent,
(b) a compound with at least one carboxyl group at its terminal position, and
(c) a modified silicone oil, (9) An interlayer film for laminated glass as described in (7) or (8) above, which is characterized by that the chelating agent is a βdiketone compound,

(10) An interlayer film for laminated glass as described in (9) above, which is characterized by that the βdiketone compound is acetylacetone,

(11) An interlayer film for laminated glass as described in (7) or (8) above, which is characterized by that the compound with at least one carboxyl group at its terminal position is selected from the group consisting of;
(a) an aliphatic carboxylic acid having 2 to 18 carbon atoms, and
(b) a hydroxy carboxylic acid having 2 to 18 carbon atoms,

(12) An interlayer film for laminated glass as described in (11) above, which is characterized by that the aliphatic carboxylic acid having 2 to 18 is 2-etylbutyrate or 2-ethylhexanoate,

(13) An interlayer film for laminated glass as described in (1) to (12) above, which is characterized by that the adhesive resin contains additionally a bond adjusting agent,

(14) An interlayer film for laminated glass as described in (13) above, wherein the bond adjusting agent is magnesium and/or potassium salt of a carboxylic acid having 2 to 10 carbon atoms,

(15) An interlayer film for laminated glass as described in (14) above, which is characterized by that the amount of the magnesium and/or potassium salt of an carboxylic acid having 2 to 10 carbon atoms is 10 to 150 ppm as magnesium and/or potassium content in the obtained interlayer film,

(16) An interlayer film for laminated glass as described in (3) to (15) above, which is obtained by dispersing tin-doped indium oxide and/or antimony-doped tin oxide into organic solvent by the use of a dispersant to prepare dispersion and, adding said dispersion into the adhesive resin optionally containing a plasticizer,

(17) An interlayer film for laminated glass as described in (16) above, which is characterized by that the organic solvent is the same with the plasticizer as is added into the adhesive resin,

(18) An interlayer film for laminated glass as described in (16) or (17) above, which is prepared by extruding the dispersion described in (16) or (17) above and the adhesive resin by using extruding machine in which two axes are arranged in parallel,

(19) In an interlayer film for laminated glass which is prepared by a method comprising dispersing tin-doped indium oxide and/or antimony-doped tin oxide in a plasticizer to obtain dispersion and adding said dispersion into the adhesive resin, the improvement lies in that the average particle diameter of tin-doped indium oxide and/or antimony-doped tin oxide in said dispersion is 10 to 80 nm at room temperature, and still 10 to 80 nm after heating dispersion up to 200° C.,

(20) A laminated glass, which is prepared by interposing an interlayer film for laminated glass described in (1) to (19) above between at least a pair of glass sheets to integrate the interlayer film and the laminated glass sheets,

(21) A laminated glass as described in (20) above, which is characterized by that the laminated glass has a visible light transmittance rate (Tv) in the light rays of 380 to 780 nm, a solar radiation transmittance rate (Ts) in the light rays of 300 to 2500 nm and the haze value (H) as follows;
Tv≧65%
Ts≦0.8×Tv
H≦1.0%,

(22) A laminated glass as described in (20) or (21) above, wherein at least one of the pair of glass sheets interposing the interlayer film is a heat-ray absorption glass which has a visible light transmittance rate of not less than 75% in the light rays of 380 to 780 nm and transmittance rate of not more than 65% in the whole light rays of 900 to 1300 nm,

(23) A laminated glass as described in (22) above, wherein the heat-ray absorption glass is a green glass,

(24) A laminated glass as described in (20) to (23) above, which is characterized by that the efficiency of the electromagnetic wave shield ΔdB in the wavelength of 10 to 2000 MHz of the laminated glass is not more than 10 dB,

(25) A laminated glass as described in (20) to (24) above, wherein the laminated glass has a visible light transmittance rate (Tv) in the light rays of 380 to 780 nm, a solar radiation transmittance rate (Ts) in the light rays of 300 to 2500 nm, the haze value (H), the efficiency of electromagnetic wave shield (ΔdB) in the wavelength of 10 to 2000 MHz and pummel value (P) as follows;

Tv≧75%

Ts≦0.8×Tv

H≦1.0%

ΔdB≦10 dB

P=a numeral from 3 to 7.

And also, the present invention relates to;

(1) An interlayer film for laminated glass, which is characterized by that an interlayer film for laminated glass is made from plasticized polyvinylacetal resin, and that tin-doped indium oxide and a compound with at least one carboxyl group at its terminal position are dispersed in the plasticized polyvinylacetal resin, (2) An interlayer film for laminated glass as described in (1) above, wherein the compound with at least one carboxyl group at its terminal position is one or more compounds selected from the group consisting of a carboxylic acid having 2 to 18 carbon atoms and a hydroxy carboxylic acid having 2 to 18 carbon atoms, (3) An interlayer film for laminated glass, which is made from plasticized polyvinylacetal resin, wherein said plasticized polyvinylacetal resin is prepared by dispersing tin-doped indium oxide particle in the plasticizer to obtain dispersion and adding said dispersion into said plasticized polyvinylacetal resin, and the particle diameter of tin-doped indium oxide in said dispersion is 10 to 80 nm at room temperature, and still 10 to 80 nm after heating the dispersion up to 200° C., and (4) A laminated glass, which is prepared by interposing an interlayer film for laminated glass as described in (1) to (3) above between at least one pair of glass sheets.

BEST MODE FOR CARRYING OUT THE INVENTION

The adhesive resin comprised in an interlayer film for laminated glass of the present invention (referred simply as an interlayer film hereinafter) is not limited specifically, but can be any resin, which has bond strength with glass under appropriate temperature and pressure without being coated with the binder on its surface, for example, any known resin generally used as a material of an interlayer film for laminated glass.

As the adhesive resin, there can be mentioned, for example, polyvinylacetal resin, polyurethane resin, ethylene-vinyl acetate resin, acryl copolymerization resin of which acryl monomer unit is acrylic acid, methacrylic acid, or a derivative thereof, or vinyl chloride-ethylene-methacrylate glycidyl copolymerization resin, and so on.

The above-mentioned resin can be easily produced by means of a known method or a method similar to the known method.

As the adhesive resin used in the present invention, preferably used is polyvinylacetal resin.

The method for producing polyvinylacetal resin is not specifically limited, but can be mentioned, for example, a method comprising dissolving polyvinylalcohol in hot water, maintaining the temperature of the obtained solution to be, for example, about 0 to 95° C., adding acid catalyst and aldehyde to said solution, completing acetalization with stirring, and then neutralizing, washing, and drying to obtain polyvinylacetal resin as powder.

In said acetalization, it is also possible to progress acetalization with stirring and to complete acetalization by maturing the reaction with increase in the reaction temperature.

In above-mentioned method for synthesizing polyvinylacetal resin, the average polymerization degree of polyvinylalcohol is preferably from about 500 to 5000 or so, more preferably from about 800 to 3000 or so, and even more preferably from about 1000 to 2500 or so.

When the average polymerization degree of polyvinylalcohol is less than 500 or so, the strength of resin film may be too weak, lowering the penetration resistance of the obtained laminated glass. On the other hand, when the average polymerization degree of polyvinylalcohol exceeds 5000 or so, it may be difficult to mold resin film, and, in addition, the strength of resin film may be too strong to lower the shock absorption or the penetration resistance of the obtained laminated glass.

Moreover, it is preferable to arrange the amount of vinylacetal to be not more than 30 mol % in polyvinylacetal resin obtained above. Thus, the saponification degree of polyvinylalcohol is preferably not less than about 70 mol %. When the saponification degree of polyvinylalcohol is less than about 70 mol %, transparency or heat resistance, or reactivity of polyvinylacetal resin may be lowered.

The average polymerization and the saponification degree of polyvinylalcohol can be determined according to, for example, a method stipulated in JIS K 6726 "Methods of testing polyvinylalcohol".

In the present invention, the aldehyde used for synthesizing polyvinylacetal resin is not specifically limited, but preferably aldehyde having 3 to 10 carbon atoms, or more preferably aldehyde having 4 to 8 carbon atoms can be used.

When the number of carbon atoms of above-mentioned aldehyde is less than 3, sufficient moldability of resin film may not be obtained in some instances, on the other hand, when the number of carbon atoms of aldehyde exceeds 10, the reactivity for acetalization will be low, and resin blocking may easily occur in the reaction and cause difficulties in synthesizing resin.

As the aldehydes to be used in the present invention, there can be mentioned, aromatic aldehyde, alicyclic aldehyde or aliphatic aldehyde, for example, propionaldehyde, n-butylaldehyde, isobutylaldehyde, barrelaldehyde, n-hexylaldehyde, 2-ethylbutylaldehyde, n-heptylaldehyde, n-octylaldehyde, n-nonylaldehyde, n-decylaldehyde, benzaldehyde, cinnamaldehyde, and so on, and these can be used preferably.

The above-mentioned aldehyde can be used singly or two or more of them can be used in combination.

In the aldehyde having 3 to 10 carbon atoms, preferably used are aldehyde having 4 to 8 carbon atoms, for example, n-butylaldehyde, n-hexylaldehyde, 2-ethylbutylaldehyde, n-octylaldehyde, and so on.

In polyvinylacetal resin obtained by acetalizing polyvinylalcohol with the above-mentioned aldehydes having 4 to 8 carbon atoms, especially preferable is polyvinylbutyral resin obtained by acetalizing polyvinylalcohol with n-butylaldehyde having 4 carbon atoms.

When above-mentioned polyvinylbutyral resin is used, the adhesiveness between the resin film and the glass is high, so the resin film has appropriate bond strength with the glass, and excellent transparency and weather resistance is realized, and in addition, polyvinylbutyral resin itself is easily produced.

Polyvinylbutyral resin obtained by hereinabove method consists of vinylbutyral, vinylalcohol and vinylacetate components.

The amount of each component mentioned above can be determined according to, for example, JIS K-6728 "Methods for testing polyvinylbutyral" or infrared absorption spectrum (IR).

In the case of polyvinylacetal resin other than polyvinylbutyral resin, measuring the amount of vinylalcohol and vinylacetate components is the first place, then the amount of vinylacetal can be calculated by subtracting the sum of the above-mentioned two components from 100.

The average butyralization degree of above-mentioned polyvinylbutyral resin is not specifically limited, but is preferably about 60 to 75 mol % or so and even preferably about 62 to 72 mol % or so.

When the average butyralization degree of polyvinylbutyral resin is less than 60 mol %, solubility with plasticizer mentioned later may be lowered, thereby it may be difficult to mix polyvinylbutyral resin with plasticizer of the necessary amount to obtain penetration resistance. On the other hand, when the average butyralization degree of polyvinylbutyral resin exceeds about 75 mol %, it may fail to obtain dynamic property necessary to obtain penetration resistance.

For the interlayer film of the present invention, it is necessary to contain tin-doped indium oxide and/or antimony-doped tin oxide in the above-mentioned adhesive resin to give heat insulation to the interlayer film.

Namely, tin-doped indium oxide and/or antimony-doped tin oxide has an excellent infrared ray (heat ray) cutting function. So adding and dispersing said tin-doped indium oxide and/or antimony-doped tin oxide into adhesive resin film makes it possible for the produced interlayer film and laminated glass to exhibit excellent heat insulation.

The addition amount of the above-mentioned tin-doped indium oxide and/or antimony-doped tin oxide is preferably about 0.1 to 3.0 parts by weight, or more preferably from about 0.13 to 3.0 parts by weight relative per 100 parts by weight of the above-mentioned adhesive resin. When the addition amount of tin-doped indium oxide and/or antimony-doped tin oxide is below about 0.1 part by weight, the sufficient infrared insulation may not be obtained, and thus the heat insulation of obtained interlayer film or laminated glass may not sufficiently be improved. On the other hand, the addition amount of tin-doped indium oxide and/or antimony-doped tin oxide exceeds about 3.0 parts by weight, the visible light transmittance of the obtained interlayer or laminated glass may be lowered.

The average particle diameter of said tin-doped indium oxide or antimony-doped tin oxide is over 0 and up to about 200 nm or so, preferably over 0 and up to about 80 nm. More preferably the average particle diameter is about 10 to 80 nm or so.

Even more preferably the particle diameter is from about 10 to 80 nm or so. In other words, the minimum particle diameter of above-mentioned tin-doped indium oxide or antimony-doped tin oxide is preferably not less than about 10 nm, and the maximum particle diameter is preferably 80 nm or less.

When the average particle diameter of said tin-doped indium oxide or antimony-doped tin oxide exceeds about 200 nm or so, scattering of visible light rays may be remarkable, thereby transmittance through the obtained interlayer film may be reduced. As the result, the haze value (the degree of preventing transparency) of the produced laminated glass may be deteriorated, and the high transparency is not obtained, which is needed for, for example, the automotive windshields.

The particle diameter of said tin-doped indium oxide or antimony-doped tin oxide can be measured by light scatter measuring device ("DLS-6000AL" (trade name), produced by Otsuka electronics Co., Ltd.) utilizing dynamic light scattering method in which Ar lazer is used as light source.

In the present invention, it is preferable that said tin-doped indium oxide and/or antimony-doped tin oxide having an average particle diameter of over 0 and up to about 200 nm or so are scattered fine and uniformly in interlayer film. By scattering tin-doped indium oxide and/or antimony-doped tin oxide fine into an interlayer film, the laminated glass produced by the use of the interlayer can have the low haze, excellent transparency and high heat insulation with the whole interlayer, and additionally, it can be possible to adjust bond strength between the glass and the interlayer film, thereby excellent penetration resistance is obtained.

Preferable embodiment is an interlayer film wherein the number of tin-doped indium oxide and/or antimony-doped tin oxide with a particle diameter of not less than 100 μm is one or less per 1 μm² of the interlayer film. That is, the embodiment in which the above-mentioned particles with the particle diameter of not less than 100 μm may not be observed in the interlayer film, or even it can be observed, it is only the particle that is set at the center of 1 square micrometer flame and no other particle with the particle diameter of not less than 100 μm can be seen within the flame, in the case of taking photographs and observing interlayer film by using transmission electron microscope.

The observation can be carried out by using transmission electron microscope, "H-7100FA type transmission electron microscope" produced by Hitachi Co., Ltd., and the photographs are taken at 100 kv acceleration voltage.

Also, preferred embodiment of the interlayer film of the present invention is an interlayer film for laminated glass, in which tin-doped indium oxide and/or antimony-doped tin oxide particles in dispersion has the average particle diameter of from 10 to 80 nm at room temperature, and still, 10 to 80 nm even after heating the dispersion up to 200° C.

The interlayer film for laminated glass obtained by molding interlayer film out of said dispersion has the low haze and excellent transparency, wherein tin-doped indium oxide and/or antimony-doped tin oxide particles are dispersed in said film.

Said dispersion, mentioned later in detail, is a solution or suspension in which tin-doped indium oxide and/or antimony-doped tin oxide particles are dispersed in an organic solvent or a plasticizer, preferably together with a dispersant.

In the present invention, it is preferable that said tin-doped indium oxide and/or antimony-doped tin oxide particles are dispersed fine and uniformly in the interlayer film to produce an interlayer film with excellent transparency, light insulation and bond strength with glass, and thus, using a dispersant is a preferred embodiment of the present invention.

As the dispersant of the present invention, for example, (a) chelating agent, (b) a compound having one or more carboxylic group at its terminal position, (c) modified silicone oil, and so on are preferably exemplified.

In the present invention, it is considered that the chelating agent used as dispersant is combined with tin-doped indium oxide and/or antimony-doped tin oxide particle, and as a result, this combination prevents cohesion of tin-doped indium oxide and/or antimony-doped tin oxide particles, thereby the haze of interlayer film for laminated glass will be improved.

Said chelating agent is not specifically limited, but includes the known chelating agent such as EDTA, βdiketone compound or the like, or preferably the chelating agent easily solvable with a plasticizer or an adhesive resin. In that mean, among the chelating agents, βdiketone compound or the like are preferable in chelating agents, and even more preferable is acetylacetone. In addition to acetylacetone, trifluoroacetylacetone, benzoyltrifluoroacetone, dipibaroylmethane, or the like can be used.

The preferable addition amount of the said chelating agent is preferably about 0.001 to 2 parts by weight, more preferably about 0.01 to 1 part by weight per 100 parts by weight of adhesive resin.

When the addition amount of the said chelating agent exceeds about 2 parts by weight, bubble may be formed in producing an interlayer film or a laminated glass, while the addition amount of the said chelating agent is below about 0.001 part by weight, desirable effect can not be obtained.

In the present invention, a compound having one or more carboxylic groups at its terminal position used as a dispersant has high dispersibility, so tin-doped indium oxide and/or antimony-doped tin oxide particles can be dispersed uniformly in resin.

Also, by using a compound having one or more carboxylic groups at its terminal position, the dispersibility of the tin-doped indium oxide and/or antimony-doped tin oxide particles can be stable even at high temperature, so the cohesion or the precipitation of tin-doped indium oxide and/or antimony-doped tin oxide may not be formed, and good dispersing state can be maintained. Thus, the obtained interlayer film for laminated glass has the low haze and excellent transparency.

As the examples of the compound having one or more carboxylic groups at its terminal position, there can be mentioned, for example, a carboxylic acid having 2 to 18 carbon atoms or a hydroxy carboxylic acid having 2 to 18 carbon atoms, and so on. As the said carboxylic acid, there can be mentioned, for example, aliphatic carboxylic acid, aliphatic dicarboxylic acid, aromatic carboxylic acid, aromatic dicarboxylic acid, and so on.

More concretely to say, there can be mentioned, benzoic acid, phthalic acid, salicylic acid, ricinoleic acid, stearic acid, 2-ethylhexanoic acid, 2-ethylbutyric acid, castor oil fatty acid, hydrogenated ricinoleic acid, and so on.

These can be used singly or two or more of them can be used in combination.

Especially, preferable is an aliphatic carboxylic acid having 2 to 18 carbon atoms, and more preferable is an aliphatic carboxylic acid having 2 to 10 carbon atoms. More concretely to say, the examples are acetic acid, propionic acid, n-butyric acid, 2-ethylbutyric acid, n-hexanoic acid, 2-ethylhexanoic acid, n-octanoic acid, and so on.

The content of the compound having one or more carboxylic groups at its terminal position is not specifically limited, but preferably is about 0.001 to 2 parts by weight or so, more preferably about 0.01 to 1 part by weight or so per 100 parts by weight of adhesive resin.

When the content of the compound having one or more carboxylic groups at its terminal position exceeds about 2 parts by weight per 100 parts by weight of adhesive resin, the interlayer film may change into yellow or the bond strength between the interlayer film and the glass may be deteriorated, while the content of the compound having one or more carboxylic groups at its terminal position is not more than about 0.001 part by weight or less per 100 parts by weight of adhesive resin, desirable effect can not be expected.

The content of the compound having one or more carboxylic group at its terminal position used as a dispersant is preferably about 0.1 to 300 parts by weight or so per 100 parts by weight of tin-doped indium oxide and/or antimony-doped tin oxide.

When the content of the compound having one or more carboxylic groups at its terminal position used as a dispersant is less than about 0.1 part by weight, the tin-doped indium oxide and/or antimony-doped tin oxide particles may not be dispersed well in a plasticizer. When the content of the compound having one or more carboxylic groups at its terminal position used as a dispersant exceeds about 300 parts by weight, the interlayer film may change into yellow or the bond strength between the obtained interlayer film for laminated glass and the glass may be extremely lowered or too much strengthened. So the content of the compound having one or more carboxylic group at its terminal position used as a dispersant is more preferably about 0.5 to 150 parts by weight.

Also, the above-mentioned compound having one or more carboxyl groups at its terminal position can be used not only in dispersing the particles but also can be added after dispersing the particles by the used of another or other dispersants, and in either case, the dispersion stability can be obtained at high temperatures.

Moreover, when the compound is added in forming an interlayer film, an interlayer film for laminated glass can be obtained, wherein tin-doped indium oxide particle and/or antimony-doped tin oxide particle are dispersed fine.

The modified silicone oil used as a dispersant in the present invention is not specifically limited, and any per se known dispersant, which is generally a viscous liquid obtained by reacting a compound which should be modified into polysiloxane, can be used. Concretely, there can be mentioned, for example, carboxyl modified silicone oil, ether modified silicone oil, epoxy modified silicone oil, ester modified silicone oil or amine modified silicone oil, and so on. These can be used singly or two or more of them can be used in combination.

As the modified silicone oil, preferable is carboxyl modified silicone oil or amine modified silicone oil.

The carboxyl modified silicone oil or amine modified silicone oil is not specifically limited, but generally pale yellow transparent viscous liquid obtained by, for example, reacting polysiloxane with the compound having carboxyl group or amine group. These can be used singly or two or more of them can be used in combination.

Moreover, preferable is the modified silicone oil wherein the modified rate is adjusted appropriately to improve the solubility with plasticizers, or the like.

Also, the addition amount of said modified silicone oil is not limited specifically, but preferably not less than about 0.5 part by weight per 100 parts by weight of tin-doped indium oxide and/or antimony-doped tin oxide, and about 0.5 or less part by weight per 100 parts by weight of the above-mentioned adhesive resin.

When the addition amount of carboxyl modified silicone oil or amine modified silicone oil is less than about 0.5 part by weight per 100 parts by weight of tin-doped indium oxide and/or antimony-doped tin oxide, enough dispersing effect may not be obtained. On the other hand, carboxyl modified silicone oil or amine modified silicone oil is added over about 0.5 part by weight per 100 parts by weight of adhesive resin, the bond strenght between the obtained interlayer film and the glasses may vary with a lapse of time.

As the dispersant of the present invention, it can be used by combining the above-mentioned (a) a chelating agent, (b) a compound having one or more carboxyl groups at its terminal position, or (c) a modified silicone oil, together with any other dispersants. As the other dispersants, there can be mentioned the dispersants generally used as dispersants of inorganic fine particles, for example, phosphate compounds such as phosphate or polyphospate, and so on, sulfate compounds such as organic sulfate, and so on, polyalcohols surfactants such as polycarboxylate, polyol ester, and so on.

In the present invention, one of the preferable embodiments is plasticizing an adhesive resin by a plasticizer.

The plasticizer used in the present invention is not specifically limited, and any per se known plasticizer generally used for an interlayer film can be used, but preferably used are, for example, organic plasticizers such as monobasic acid ester, polybasic acid ester, and so on, phosphoric acid plasticizers such as organic phosphoric acid, organic phosphorous acid, and so on.

These plasticizers can be used singly or two or more of them can be used in combination.

The monobasic acid ester is not limited specifically, but there may be mentioned, for example, glycol ester obtained by reacting triethylene glycol with organic acid such as butyric acid, iso-butyric acid, caproic acid, 2-ethylbutyric acid, heptanoic acid, n-octylic acid, 2-ethylhexylic acid or pelargonic acid (n-nonylic acid), decylic acid, or the like, or glycol ester obtained by reacting tetraethylene glycol or tripropylene glycol with the above-mentioned organic acid, and these can be used preferably.

These monobasic acid esters can be used singly or two or more of them can be used in combination.

The polybasic acid ester is not limited specifically, but there may be mentioned, ester obtained by reacting organic acid such as adipic acid, sebacic acid or azelaic acid, or the like with a straight-chain or branched alcohol having about 4 to 8 carbon atoms, and these are used preferably.

These polybasic acid esters can be used singly or two or more of them can be used in combination.

The organic phosphoric acid plasticizer is, not limited specifically, but there may be mentioned, for example, tributoxyethylphosphate, isodecylphenylphospate or triisopropylphosphite, or the like, and these can be used preferably.

These organic phosphoric acid plasticizers can be used singly or two or more of them can be used in combination.

Among the above-mentioned plasticizers, especially preferable is, for example, triethylene glycol di-2-ethylhexanoate(3GO), oligoethylene glycol di-2-ethylhexanoate (NGO), tetraethylene glycol di-n-heptanoate(4G7), triethylene glycol di-2-ethylbutylate(3 GH), triethylene glycol di-n-heptanoate(3G7), or the like.

These plasticizers can be used singly or two or more of them can be used in combination.

The above-mentioned plasticizers can be manufactured easily by per se known method, and can be manufactured as follows.

The above-mentioned 3GO is obtained by reacting triethyleneglycol with 2-ethylhexylic acid of not less than about 2-fold equivalents thereof under a catalyst.

Also, NGO is obtained by reacting origoethylene glycol with 2-ethylhexylic acid of not less than about 2-fold equivalents thereof under a catalyst. The origoethylene glycol contains not less than about 90 weight % of compound composed of 3 to 9 ethyleneglycol units, and is commercially distributed by, for example, Mitsui Tosho Chemical Co., Ltd, Mitsubishi Chemical Co., Ltd, Nisso Chemical Co., Ltd, and so on.

Also, 4G7 is obtained by reacting tetraethyleneglycol with n-heptanoate of not less than about 2-fold equivalents thereof under a catalyst.

Moreover, 3GH is obtained by reacting triethyleneglycol with 2-ethylbuthyrate of not less than about 2-fold equivalents thereof under a catalyst.

The addition amount of the above-mentioned plasticizer to the above-mentioned adhesive resin is not limited specifically, but preferably about 20 to 60 parts by weight or so, more preferably about 30 to 50 parts by weight or so per 100 parts by weight of adhesive resin.

At an addition amount below 20 parts by weight per 100 parts by weight of adhesive resin, the impact absorption of the obtained interlayer film or laminated glass may not be enough. On the other hand, at an addition amount exceeding about 60 parts by weight per 100 parts by weight of adhesive resin, the plasticizer may bleed out, increasing the optical strain of the obtained laminated glass or interlayer film, or decreasing the transparency or bond strength between the interlayer film and the glass.

Also, an interlayer film for laminated glass of the present invention can optionally contain a bond adjusting agent.

As the above-mentioned bond adjusting agent, there can be mentioned, for example, alkali metal salt, or alkaline earth metal salt of organic acid or inorganic acid, or the like.

The above-mentioned alkali metal salt and alkaline earth metal salt are not limited specifically, for example, salt of potassium, sodium or magnesium, and so on. The above-mentioned organic acid is not limited specifically, there may be mentioned, for example, carboxylic acid such as octylic acid, hexylic acid, butyric acid, acetic acid or formic acid, and so on. The inorganic acid is not limited specifically, but there may be mentioned, for example, hydrochloric acid or nitric acid, and so on.

These bond adjusting agents can be used singly or two or more of them can be used in combination.

Among the above-mentioned alkali metal salt or alkaline earth metal salt of organic or inorganic acids, alkali metal salt or alkaline earth metal salt of organic acids having 2 to 16 carbon atoms is preferable. More preferably used is magnesium salt or potassium salt of carboxylic acid having 2 to 16 carbon atoms.

As the above-mentioned magnesium salt or potassium salt of carboxylic acid having 2 to 16 carbon atoms, which is not limited specifically, there may be mentioned, for example, magnesium acetate, potassium acetate, magnesium propionate, potassium propionate, magnesium 2-ethylbutanate, potassium 2-ethylbutanate, magnesium 2-ethylhexanate or potassium 2-ethylhexanate, and so on. These can be used singly or two or more of them can be used in combination.

As bond adjusting agent, preferably used are magnesium salts and potassium salts of carboxylic acid having about 2 to 10 carbons.

The above-mentioned magnesium salt of carboxylic acid having 2 to 10 carbon atoms is not limited specifically, but there may be mentioned, for example, magnesium acetate, magnesium propanoate, magnesium butanoate, magnesium pentanoate, magnesium hexanoate, magnesium 2-ethylbutylate, magnesium heptanoate, magnesium octanoate or magnesium 2-ethylhexanate, and so on.

The above-mentioned potassium salt of carboxylic acid having 2 to 10 carbon atoms is not limited specifically, but there may be mentioned, for example, potassium acetate, potassium propanoate, potassium butanoate, potassium pentanoate, potassium hexanoate, potassium 2-ethylbutylate, potassium heptanoate, potassium octanoate or potassium 2-ethylhexanate, and so on.

These can be used singly or two or more of them can be used in combination. By using two or more of the above-mentioned salts enables to adjust bond strength with small amount.

The addition amount of the above-mentioned bond adjusting agent is preferably about 0.001 to 0.5 part by weight per 100 parts by weight of adhesive resin. At an addition amount below about 0.001 part by weight, tackiness at peripheral parts of an interlayer film for laminated glass may decrease under high-humid atmosphere. At an addition amount exceeding about 0.5 part by weight, the tackiness of the obtained interlayer film for laminated glass may be decreased, and the transparency of the film may be lost. Or the humidity resistance of the obtained interlayer film may be lowered.

The more preferred addition amount of bond adjusting agent is about 0.01 to 0.2 part by weight per 100 parts by weight of adhesive resin, and also, is about 10 to 150 ppm or so in the interlayer film as the content of magnesium and/or potassium. At an addition amount below about 10 ppm as the content of magnesium and/or potassium, tackiness at prepheral parts of an interlayer film for laminated glass may decrease. Also, an addition amount exceeding about 150 ppm, tackiness of the obtained interlayer film for laminated glass may decrease, and also transparency of the film may be lost. Also, humidity resistance of the obtained interlayer film may decrease.

Then as the bond adjusting agent, the modified silicone oil disclosed in Japanese Patent Publication for Opposition 29950/1980 can be used together.

However, in the case where modified silicone oil is used as a dispersant, there is no need to add another modified silicone oil as bond adjusting agent, but in the case where other dispersant is used, the modified silicone oil can be used as a bond adjusting agent simultaneously.

In general, the above-mentioned modified silicone oil is viscous liquid obtained by reacting a compound which should be modified into polysiloxane. The above-mentioned modified silicone oil is not limited specifically, but there may be mentioned, for example, carboxyl modified silicone oil, ether modified silicone oil, epoxy modified silicone oil, ester modified silicone oil, amine modified silicone oil, and so on. These can be used singly or two or more of them can be used in combination.

The content of the above-mentioned modified silicone oil is preferably about 0.005 to 0.5 part by weight per 100 parts by weight of adhesive resin. At the content exceeding about 0.5 part by weight, the tackiness between an interlayer film for laminated glass and the glass is decreased, causing exfoliation, bubbling, and the like. More preferably, the content of the modified silicone oil is about 0.02 to 0.2 part by weight or so.

The method for producing an interlayer film of the present invention is not limited specifically, but an interlayer film of the present invention can be produced by per se known method. For example, an interlayer film can be produced by adding optionally dispersant, plasticizer or bond adjusting agent into an adhesive resin, dispersing tin-doped indium oxide and/or antimony-doped tin oxide to give resin composition, and then melt-kneading said resin composition, followed by forming sheets.

As the method for producing an interlayer film of the present invention, the methods can be exemplified as follows.

(Method A) A method for producing an interlayer film by adding adhesive resin, tin-doped indium oxide and/or antimony-doped tin oxide, optionally dispersant, plasticizer or bond adjusting agent respectively to give resin composition, and then melt-kneading the said resin composition, followed by forming sheets.

(Method B) A method for producing an interlayer film by mixing adhesive resin, tin-doped indium oxide and/or antimony-doped tin oxide, and optionally dispersant, then adding optionally plasticizer or bond adjusting agent to give resin composition, and then melt-kneading said resin composition, followed by forming sheets.

(Method C) A method for producing an interlayer film by adding the dispersion produced by dispersing tin-doped indium oxide and/or antimony-doped tin oxide into organic solvent by the use of dispersant, to adhesive resin optionally containing plasticizer, and then melt-kneading the resin composition, followed by forming sheets.

Mixing or melt-kneading in the above-mentioned methods can be carried out with the devices generally used for dispersing or mixing coating agents such as a sandmill, a ballmill, a homogenizer, an attritor, a high-speed stirring device, an ultra-wave dispersant device, and so on.

After melt-kneading the adhesive composition, the composition are preferably formed into sheets by means of the extruding, calendering, pressing, casting, inflation, and the like, and the resulting sheets are used as interlayer film. Besides, preferable is to produce the film by extruding method by using extruding machine in which two axes are arranged in parallel.

As the method for producing an interlayer film of the present invention, preferable is method C, whereby tin-doped indium oxide and/or antimony-doped tin oxide particle are dispersed into resin film unifomly.

By using method A or B, the cohesion of tin-doped indium oxide and/or antimony-doped tin oxide particle may occur in melt-kneading the resin composition, deteriorating the haze of the obtained interlayer film or a laminated glass.

In the method C, as the vehicle to disperse tin-doped indium oxide particles and/or antimony-doped tin oxide particles, organic solvent is preferable, and among the organic solvent, the organic solvent, which is well solvable in the above-mentioned adhesive resin or dispersant, is more preferable. Especially, the plasticizer used for an interlayer film of the present invention, or the same kinds of plasticizers are preferable as the vehicle to disperse the particles.

As the method for adding and dispersing tin-doped indium oxide and/or antimony-doped tin oxide particles to the dispersing vehicle, the method of adding and dispersing whole designated amount of tin-doped indium oxide and/or antimony-doped tin oxide particles to whole designated amount of the above-mentioned organic solvent can be used. Also, the method of adding and dispersing whole designated amount of tin-doped indium oxide and/or antimony-doped tin oxide particles to a part of designated amount of the above-mentioned organic solvent to prepare the dispersing vehicle master batch of tin-doped indium oxide and/or antimony-doped tin oxide, and then mixing with the rest of the above-mentioned organic solvent can be used.

As the method to disperse the average particle diameter of tin-doped indium oxide and/or antimony-doped tin oxide to be over 0 nm and not more than about 80 nm or so, there may be mentioned the method of adding and dispersing tin-doped indium oxide and/or antimony-doped tin oxide with the above-mentioned average particle diameter into above-mentioned organic solvent, or the method of adding and dispersing tin-doped indium oxide and/or antimony-doped tin oxide into the above-mentioned organic solvent, then making tin dope indium oxide and/or antimony-doped tin oxide have the above-mentioned particle diameter by the use of crusher such as a ballmill, an atomizer mill, and so on.

In producing an interlayer film of the present invention, one or more known additives generally used for an interlayer film for laminated glass can be optionally incorporated to a certain degree so long as the objectives of the present invention are not impaired. As said additives, there may be mentioned, for example, an ultraviolet absorber, a light stabilizer, an antioxidant, a surfactant such as sodium lauryl sulfate, sodium alkilbenzenesulfate, or the like, a coloring agent, and so on.

In the case where such additive is incorporated, it can be added at any step of the above-mentioned producing process of an interlayer film.

The ultraviolet absorber is not limited to any particular species but preferably includes benzotriazole type, for example, "TINUVIN P", "TINUVIN 320", "TINUVIN 326", or "TINUVIN 328", produced by Ciba-specialty Chemicals Co., Ltd, or the like.

These ultraviolet absorbers can be used singly or two or more of them can be used in combination.

The light stabilizer is not limited to any particular species but preferably includes a hindered amine type, for example, "ADEKASTAB LA-57" produced by Asahi Denka Kogyo, and so on.

These light stabilizers can be used singly or two or more of them can be used in combination.

The antioxidant (antiaging agent) is not limited to any particular species but preferably includes phenol type, for example, "Sumilizer-BHT" produced by Sumitomo Chemical Co., Ltd, "Irganox 1010" produced by Ciba-specialty Chemicals Co., Ltd, and so on.

These antioxidants (antiaging agents) can be used singly or two or more of them can be used in combination.

The surfactant is not limited to any particular species but includes, for example, sodium lauryl sulfate, sodium alkylbenzenesulfonate, and so on.

These surfactants can be used singly or two or more of them can be used in combination.

The interlayer film of the present invention can be used as monolayer or a laminated multi-layers.

The average total thickness of the interlayer film of the present invention is not limited specifically, but from the point of view of the minimum penetration resistance, shock absorption, weather resistance, and so on required for laminated glass and from the practical viewpoint, the average thickness is similar to that of the common interlayer film for laminated glass, and is preferably within about 0.2 to 1.6 mm or so, more preferably about 0.3 to 0.8 mm or so.

The laminated glass of the present invention can be formed by interposing the above-mentioned interlayer film of the present invention between at least a pair of glass sheets.

However, in order to improve the penetration resistance, the interlayer film of the present invention and other interlayer film can be optionally laminated in forming the laminated glass of the present invention.

The kind of the above-mentioned glass is not limited to any particular species, but includes generally used transparent sheet glass.

Concretely, there may be mentioned various kinds of inorganic glasses, for example, float sheet glass, polished sheet glass, embossed sheet glass, net sheet glass, wire sheet glass or colored sheet glass, and so on, or organic glasses, for example, polycarbonate sheet or polymethyl methacrylate sheet, and so on.

These glasses can be used singly or two or more of them can be used in combination. Also, the thickness of the glass can be selected appropriately according to the intended use, and is not limited to any particular value.

As the glass used for laminated glass of the present invention, preferably used is heat-absorption glass having not more than about 65% transparency at wavelength of 900 nm to 1300 nm.

More preferable is the said heat-absorption glass having not less than 75% transparency at the wavelength of 380 nm to 780 nm.

The insulation rate of infrared ray of tin-doped indium oxide or antimony-doped tin oxide is high at longer wavelength than 1300 nm, and relatively low within the range of 900 nm to 1300 nm. Thus, laminating the interlayer film of the present invention with above-mentioned heat absorption glasses enables to lower solar radiation transmittance rate against visible light transmittance rate compared to laminating with clear glass, thus, increasing in the insulation rate of solar radiation.

As the heat absorption glass, green glass is preferable. The green glass includes the known ones.

The above-mentioned heat absorption glass can be used on one side or both sides of a pair of glasses interposing the interlayer film of the present invention.

The laminated glass of the present invention is not limited specifically, and can be produced by any ordinary method of producing laminated glass. For example, the objective laminated glass can be obtained by interposing an interlayer film of the present invention between two transparent glass sheets, placing them into a vacuum bag such as rubber bag, preliminary bonding at about 70 to 110° C. while suctioning under reduced pressure, and then post-bonding at about 120 to 150° C. under a pressure of about 1 to 1.5 MPa (about 10 to 15 kg/cm$^2$) by using an autoclave or a press.

The preferable embodiment of the laminated glass of the present invention has a visible light transmittance rate (Tv) of not less than 65% in the light rays of 380 to 780 nm, a solar radiation transmittance rate (Ts) in the light of 300 to 2500 nm of not more than 80% of said visible light transmittance rate (Tv), and the haze value (H) of up to 1.0%.

Preferably, the laminated glass of the present invention has electromagnetic wave shield (ΔdB) of not more than 10 dB in the wavelength of 10 to 2000 MHz.

The preferable embodiment of the laminated glass of the present invention has a visible light transmittance rate (Tv) of not less than 75% in the light rays of 380 to 780 nm, a solar radiation transmittance rate (Ts) in the light of 300 to 2500 nm of not more than 80% of said visible light transmittance rate (Tv), the haze value (H) of up to 1.0%, electromagnetic wave shield (ΔdB) of not more than 10 dB in the wavelength of 10 to 2000 MHz and pummel value (P) of 3 to 7 or so.

The visible light transmittance rate (Tv), the solar radiation transmittance rate (Ts), the haze value (H) and the electromagnetic wave shield (ΔdB) mean the visible light transmittance rate (Tv), the solar radiation transmittance rate (Ts), the haze value (H) and the electromagnetic wave shield (ΔdB) measured by the following methods respectively.

[The Measuring Method of the Visible Light Transmittance Rate (Tv)]

The visible light transmittance rate (Tv) of the laminated glass in the light rays of 380 to 780 nm is measured with automated spectrophotometer ("U4000" (trade name) produced by Hitachi Co., Ltd). By using this, the visible light transmittance rate (Tv) in the light rays of 380 to 780 nm is determined in accordance with a method stipulated in JIS R-3106(1998) "Methods of testing transmittance rate, reflectance rate, emissivity rate and acquisition rate of solar radiation of the sheet glasses".

At the above-mentioned Tv below about 65%, the transparency of the laminated glass is low, and from practical viewpoint, the laminated glass is not preferable.

[The Measuring Method of the Solar Radiation Transmittance Rate (Ts)]

The solar radiation transmittance rate (Ts) in the light rays of 300 to 2500 nm is measured by using automated spectrophotometer ("U4000" (trade name)), and is determined in accordance with JIS R-3106(1998).

At the above-mentioned solar radiation transmittance rate (Ts) exceeding about 80% of the above-mentioned visible light transmittance rate (Tv), the heat insulation of the laminated glass is not enough.

[The Measuring Method of the Haze Value]

The haze value (H) in the light rays of 340 to 1800 nm is measured by integral turbidimeter (produced by Tokyo Denshoku) and determined in accordance with JIS K-6714 "methacryl resin plate for aircrafts".

At the haze value exceeding about 1.0%, the transparency of the laminated glass is small and is not practical.

[The Measuring Method of the Electromagnetic Wave Shield (ΔdB)]

In accordance with the KEC method (Method of testing the electromagnetic wave shield effect), the reflection loss (dB) in electromagnetic wave in the wavelength of 10 to 2,000 MHz of the laminated glass and that of a common float sheet glass (the thickness is 3 mm) are measured respectively, and the maximum difference (ΔdBmax) between their reflection loss (dB) is designated as the electromagnetic wave shield (ΔdB).

At above-mentioned ΔdB exceeding about 10 dB, the electromagnetic wave transmittance will not be satisfactory.

[The Measuring Method of the Pummel Value]

The laminated glass is left standing at a temperature of −18±0.6° C. for 16 hours and then stricken with a hammer having a head weight of 0.45 kg to crush the glass to fragments with a particle diameter of not more than 6 mm. Then, the extent of exposure of an interlayer film was graded after the glasses' exfoliating partially. Judging from the boundary sample, the result is shown as pummel value according to the standards shown in table 1.

The greater the above-mentioned pummel value is, the stronger the bond strength between the interlayer film and the glass is, and the smaller the above-mentioned pummel value is, the weaker the bond strength between the interlayer film and the glass is.

TABLE 1

| The extent of exposure of the interlayer film (area %) | Pummel value |
|---|---|
| 100 | 0 |
| 90 | 1 |
| 85 | 2 |
| 60 | 3 |
| 40 | 4 |
| 20 | 5 |
| 10 | 6 |
| 5 | 7 |
| Not more than 2 | 8 |

The following Examples illustrate the present invention in further detail, but the present invention is not limited to these Examples.

In the Examples, ITO represents tin-doped indium oxide, and 3GO represents triethylene glycol-di-2-ethylhexanoate. The Examples were evaluated by the following method.

(1) ITO Size Distribution in the Solution

Measuring ITO size distribution in 3GO solution was carried out by microtruck UPA grain size analyzer produced by Nikkiso Co., Ltd.

(2) Distribution of ITO Fine Particles in the Film

After preparing ultra-flake of the interlayer film, the distribution of ITO fine particles were photographed and observed under the following conditions by using transmission electron microscope (TEM). The photographing was carried out in the range of 3 μm×4 μm at 20,000 fold and enlarged to 3 times at the time of printing.

The particle diameter of ITO fine particle was the longest one of ITO fine particle in the photograph taken by the above-mentioned exposure. Also, the average particle diameter was obtained by measuring the diameters of all ITO fine particles in the scope of 3 μm×4 μm, and converting them into volume value. Moreover, counting the number of the fine particles having the particle diameter of not less than 100 nm within the above-mentioned scope, dividing them by 12 μm² to calculate the number of the particles per 1 μm².

[Devices, Conditions]

transmission electron microscope device: transmission electron microscope H-7100FA type produced by Hitach Co., Ltd.

accelerated voltage: 100 kV slicer: ultramicrotome

EM-ULTRACUT•SFC-S type produced by Rika Co., Ltd: freezing cutter system

REICHERT-NISSEI-FCS produced by Rika Co., Ltd knife: DIATOME ULTRA CRYO DRY produced by DIATOME Co., Ltd (3) Characteristics of the Laminated Glass (a) Optical Characteristics In optical characteristics tests, the transmittance rate in the light rays of 300 to 2500 nm of the laminated glass was measured with automated spectrophotometer ("U4000 type" (trade name) produced by Hitachi Co., Ltd). With this, the visible light transmittance rate Tv in the light rays of 380 to 780 nm and the solar radiation transmittance rate Ts in light rays of 300 to 2500 nm were determined in accordance with JIS Z 8722 and JIS R 3106(1998).

(b) The Haze Value (H)

The haze value was determined in accordance with JIS K 6714.

(c) Electromagnetic Wave Transmittance

In accordance with the KEC method (Method of testing the electromagnetic wave shield effect), the reflection loss (dB) for electromagnetic wave within the range of 10 to 2,000 MHz of the laminated glass and that of a common float sheet glass with the thickness of 2.5 mm were measured respectively, and the maximum difference (ΔdBmax) between their reflection loss (dB) was designated as the electromagnetic wave shield (ΔdB).

(d) Pummel Value

The bond strength of interlayer film with the glass for the interlayer film is evaluated by pummel value. The test method is shown as follows. The greater the pummel value is, the stronger the bond strength between interlayer film and glass is. The smaller the pummel value is, the weaker the bond strength between interlayer film and glass is.

The laminated glass was left standing at a temperature of −18±0.6° C. for 16 hours and then stricken with a hammer having a head weight of 0.45 kg to crush the glass to fragments with the particle diameter of not more than 6 mm. Then, the extent of exposure of an interlayer film was graded after the glasses' exfoliating partially. Judging from the boundary sample, the result was shown as pummel value according to the table 2.

TABLE 2

| The extent of exposure of the interlayer film (area %) | Pummel value |
| --- | --- |
| 100 | 0 |
| 90 | 1 |
| 85 | 2 |
| 60 | 3 |
| 40 | 4 |
| 20 | 5 |
| 10 | 6 |
| 5 | 7 |
| Not more than 2 | 8 |

EXAMPLE 1

(1) Synthesis of Polyvinylbutyral Resin

To 2890 g of deionized water, 275 g of polyvinyl alcohol with an average polymerization degree of 1700 and a saponification degree of 99.2 mole % was added, and the mixture was heated for dissolving. After the reaction mixture was cooled to 15° C., 201 g of 35 weight % hydrochloric acid and 157 g of n-butyraldehyde were added, and the reaction mixture was maintained at this temperature to precipitate the reaction product. Thereafter, the liquid temperature was raised to 60° C. and maintained at this level for 3 hours to complete the reaction. Then, the reaction mixture was washed with an excessive amount of water for washing away unreacted n-butyraldehyde, neutralized with sodium hydroxide, which is the common neutralizing agent, moreover washed with an excessive amount of water for 2 hours and dried to provide polyvinyl butyral resin as white powder with an average butyralization degree of 68.5 mole %.

(2) Production of ITO Dispersion in Plasticizer

To 40 parts by weight of 3GO, 0.3 part by weight of ITO powder was added, then ITO fine particles were dispersed in 3GO with plane-type microbeadmill by using polyphosphoric acid ester salt as a dispersant. Thereafter, to said solution, 0.1 part by weight of acetylacetone was added under stirring to produce ITO dispersion in plasticizer. The average particle diameter of ITO fine particle in the solution was 35 nm.

(3) Production of an Interlayer Film for Laminated Glass

To 100 parts by weight of the obtained polyvinyl butyral resin, 40 parts by weight of the above-mentioned ITO dispersion in plasticizer was added. Then magnesium 2-ethylbutyrate was added appropriately to be 60 ppm as magnesium content to the reaction mixture. The mixture was melt-kneaded thoroughly with a mixing roll and press-molded with a press-molding machine at 150° C. for 30 minutes to provide an interlayer film for laminated glass having an average thickness of 0.76 mm. The average particle diameter of ITO fine particle in the film was 56 nm, the particles having the particle diameter of not less than 100 nm were not observed.

(4) Production of a Laminated Glass

The obtained interlayer film for laminated glass was interposed between two transparent float sheet glasses (30 cm×30 cm×2.5 mm thickness) and the assembly was placed in a rubber bag and deaerated under a vacuum of 2.7 kPa (20 torr) for 20 minutes. The deaerated assembly was transferred to an oven under suction and pressed under vacuum at 90° C. for 30 minutes. The prebonded laminated glass thus obtained was subjected to post-bonding in an autoclave at 135° C. and 1.2 MPa (12 kg/cm$^2$) for 20 minutes to provide a laminated glass. As the laminated glass thus obtained was measured by the above-mentioned method, the laminated glass was found to have a visible light transmittance rate (Tv) of 87.3%, a solar radiation transmittance rate (Ts) of 63.2%, the haze value (H) of 0.5%, the electromagnetic wave shield (ΔdB) of 3, and pummel value (P) of 5.

Also, by using 2.5 mm thickness green glass having a visible light transmittance rate of 85%, a solar radiation transmittance rate of 70%, a spectral transmittance rate of 52% within the range of 900 to 1300 nm, a laminated glass was produced in the same manner as the above-mentioned method. As the laminated glass thus obtained was measured by the above-mentioned methods, the laminated glass was found to have a visible light transmittance rate (Tv) of 76.7%, a solar radiation transmittance rate (Ts) of 43.6%, and the haze value (H) of 0.5%.

EXAMPLES 2 TO 10

A resin film was prepared and evaluated as in Example 1 except that the compounds shown in tables 3 to 8 were added instead of acetylacetone in the preparation of ITO dispersion in plasticizer. In Examples 7 to 10, a chelating agent and carboxylic acid compound were added 0.1 part by weight respectively.

EXAMPLE 11

A resin film was prepared and evaluated as in Example 8 except that plustmill in which two axes are arranged in parallel was used for the preparation of an interlayer film for a laminated glass.

EXAMPLES 12 TO 14

A resin film was prepared and evaluated as in Example 8 except that a metal salt shown in table was added instead of magnesium 2-ethylbutyrate in the preparation of an interlayer film for laminated glass.

EXAMPLES 15 TO 18

A resin film was prepared and evaluated as in Example 1, 4, 5, 9 respectively, except that a chelating agent and/or a carboxylic acid compound was added simultaneously at adding a plasticizer and the resin into a mixing roll instead of adding a chelating agent and/or a carboxylic acid compound into a plasticizer in which ITO fine particles were dispersed before mixing with the resin.

EXAMPLE 19

A resin film was prepared and evaluated as in Example 18 except that ITO dispersion in plasticizer, which has insufficient dispersibility because of cohesion of ITO fine particles in the plasticizer, was used.

EXAMPLES 20 TO 23

A resin film was prepared and evaluated as in Example 9 except that sulfuric ester, polycarboxylate, organic sulfonate, and polyester were used instead of polyphosphate as the dispersant to disperse ITO powders in the plasticizer.

EXAMPLES 24 TO 43

A resin film was prepared and evaluated as in Examples 1 to 19 except that ITO was added 1.0 part by weight. Examples 42 and 43 were carried out as in Example 19.

EXAMPLE 44

A resin film was prepared and evaluated as in Example 32 except that interlayer film having the average thickness of 0.4 mm was obtained by adjusting press-molding in the preparation of an interlayer film.

EXAMPLES 45 TO 48

A resin film was prepared and evaluated as in Examples 7 to 10 except that ITO was added 2.0 parts by weight.

COMPARATIVE EXAMPLE 1

A resin film was prepared and evaluated as in Example 1 except that ITO and acetylacetone were not added.

COMPARATIVE EXAMPLE 2

A resin film was prepared and evaluated as in Example 8 except that ITO was added 0.05 part by weight.

COMPARATIVE EXAMPLE 3 TO 5

A resin film was prepared and evaluated as in Examples 4 to 6 except that ITO was added 5 parts by weight.

COMPARATIVE EXAMPLE 6

A resin film was prepared and evaluated as in Example 1 except that acetylacetone was not added.

COMPARATIVE EXAMPLE 7

A resin film was prepared and evaluated as in Example 1 except that carboxylic modified silicone was added instead of acetylacetone.

COMPARATIVE EXAMPLE 8

A resin film was prepared and evaluated as in Comparative Example 6 except that ITO dispersion in plasticizer obtained by dispersing finer ITO fine particles into the plasticizer was used.

COMPARATIVE EXAMPLE 9

A resin film was prepared and evaluated as in Example 24 except that acetylacetone was not added.

COMPARATIVE EXAMPLE 10

A resin film was prepared and evaluated as in Comparative Example 9 except that ITO dispersion in plasticizer obtained by dispersing finer ITO fine particles into the plasticizer was used.

COMPARATIVE EXAMPLE 11

A resin film was prepared and evaluated as in Example 45 except that acetylacetone was not added.

COMPARATIVE EXAMPLE 12

The known interlayer film (the average thickness was 0.76 mm) not containing ITO, and a heat reflection glass sheet as one of the float sheet glasses for laminated glass were used to produce a laminated glass, and evaluated.

COMPARATIVE EXAMPLE 13

A laminated glass was prepared and evaluated after interposing heat reflection PET (polyethylene terephthalate coated with a heat ray reflection agent) between two common interlayer films (average thickness was 0.38 mm) not containing ITO.

TABLE 3

| | | Contents | | | | | Addition method | Solution |
|---|---|---|---|---|---|---|---|---|
| | No. | addition amount of ITO | chelating agent | carboxylic acid | Others | Metal salt | chelating agent carboxylic acid | average particle diameter in solution |
| Example | 1 | 0.3 | AC | — | — | Mg 2-ethylbutyrate | In ITO solution | 35 nm |
| | 2 | 0.3 | TAA | — | — | Mg 2-ethylbutyrate | In ITO solution | 34 nm |
| | 3 | 0.3 | — | acetic acid | — | Mg 2-ethylbutyrate | In ITO solution | 39 nm |

TABLE 3-continued

| | | Contents | | | | Addition method | Solution |
|---|---|---|---|---|---|---|---|
| No. | addition amount of ITO | chelating agent | carboxylic acid | Others | Metal salt | chelating agent carboxylic acid | average particle diameter in solution |
| 4 | 0.3 | — | 2-ethyl butyric acid | — | Mg 2-ethylbutyrate | In ITO solution | 31 nm |
| 5 | 0.3 | — | 2-ethyl hexanoic acid | — | Mg 2-ethylbutyrate | In ITO solution | 31 nm |
| 6 | 0.3 | — | ricinoleic acid | — | Mg 2-ethylbutyrate | In ITO solution | 35 nm |
| 7 | 0.3 | AC | acetic acid | — | Mg 2-ethylbutyrate | In ITO solution | 34 nm |
| 8 | 0.3 | AC | 2-ethyl butyric acid | — | Mg 2-ethylbutyrate | In ITO solution | 31 nm |
| 9 | 0.3 | AC | 2-ethyl hexanoic acid | — | Mg 2-ethylbutyrate | In ITO solution | 29 nm |
| 10 | 0.3 | AC | ricinoleic acid | — | Mg 2-ethylbutyrate | In ITO solution | 35 nm |
| 11 | 0.3 | AC | 2-ethyl butyric acid | — | Mg 2-ethylbutyrate | In ITO solution | 31 nm |
| 12 | 0.3 | AC | 2-ethyl butyric acid | — | Mg acetate | In ITO solution | 31 nm |
| 13 | 0.3 | AC | 2-ethyl butyric acid | — | K acetate/Mg 2-ethylbutyrate | In ITO solution | 31 nm |
| 14 | 0.3 | AC | 2-ethyl butyric acid | — | Mg acetate/Mg 2-ethylbutyrate | In ITO solution | 29 nm |
| 15 | 0.3 | AC | — | — | Mg 2-ethylbutyrate | In melt-kneading | 50 nm |
| 16 | 0.3 | — | 2-ethyl butyric acid | — | Mg 2-ethylbutyrate | In melt-kneading | 50 nm |
| 17 | 0.3 | — | 2-ethyl hexanoic acid | — | Mg 2-ethylbutyrate | In melt-kneading | 50 nm |
| 18 | 0.3 | AC | 2-ethyl hexanoic acid | — | Mg 2-ethylbutyrate | In melt-kneading | 50 nm |
| 19 | 0.3 | AC | 2-ethyl hexanoic acid | — | Mg 2-ethylbutyrate | In melt-kneading | 210 nm |
| 20 | 0.3 | AC | 2-ethyl hexanoic acid | — | Mg 2-ethylbutyrate | In ITO solution | 29 nm |
| 21 | 0.3 | AC | 2-ethyl hexanoic acid | — | Mg 2-ethylbutyrate | In ITO solution | 29 nm |
| 22 | 0.3 | AC | 2-ethyl hexanoic acid | — | Mg 2-ethylbutyrate | In ITO solution | 29 nm |
| 23 | 0.3 | AC | 2-ethyl hexanoic acid | — | Mg 2-ethylbutyrate | In ITO solution | 29 nm |

In Table 3,
AC represents acetylacetone,
TAA represents trifluoroacetylacetone,
K stands for potassium, and
Mg stands for magnesium.

TABLE 4

| | | | Results | | | | | | | | | |
|---|---|---|---|---|---|---|---|---|---|---|---|---|
| | | | | laminated clear glass | | | laminated heat absorption glass | | | | Pummel | |
| | No. | the average particle diameter in the film | the number of particles with not less than 100 nm | a visible light trancemittance rate | a solar radiation trancemittance rate | Haze value | a visible light trancemittance rate | a solar radiation trancemittance rate | Haze value | Δ dB | value | evaluation | Remarks |
| Example | 1 | 56 nm | 0 | 87.6 | 63.2 | 0.5 | 76.2 | 43.6 | 0.5 | 3 | 5 | ○ | |
| | 2 | 58 nm | 0.1 | 87.5 | 63.6 | 0.5 | 76.1 | 44 | 0.5 | 3 | 5 | ○ | |
| | 3 | 58 nm | 0.1 | 87.2 | 63.3 | 0.5 | 75.8 | 43.7 | 0.5 | 3 | 5 | ○ | |
| | 4 | 55 nm | 0 | 87.7 | 63.4 | 0.5 | 76.3 | 43.8 | 0.5 | 3 | 5 | ○ | |
| | 5 | 55 nm | 0 | 87.6 | 63.5 | 0.5 | 76.2 | 43.9 | 0.5 | 3 | 5 | ○ | |
| | 6 | 56 nm | 0 | 87.5 | 63.2 | 0.5 | 76.1 | 43.6 | 0.5 | 3 | 5 | ○ | |
| | 7 | 58 nm | 0 | 87.3 | 63.8 | 0.5 | 75.9 | 44.2 | 0.5 | 3 | 5 | ○ | |
| | 8 | 47 nm | 0 | 87.2 | 63.4 | 0.4 | 75.8 | 43.8 | 0.4 | 3 | 5 | ○ | |
| | 9 | 46 nm | 0 | 87.6 | 63.3 | 0.4 | 76.2 | 43.7 | 0.4 | 3 | 5 | ○ | |
| | 10 | 50 nm | 0 | 87.6 | 62.8 | 0.4 | 76.2 | 43.2 | 0.4 | 3 | 5 | ○ | |
| | 11 | 44 nm | 0 | 87.5 | 62.9 | 0.4 | 76.1 | 43.3 | 0.4 | 3 | 5 | ○ | ※1) |
| | 12 | 53 nm | 0 | 87.4 | 63.6 | 0.5 | 76 | 44 | 0.5 | 3 | 5 | ○ | |
| | 13 | 52 nm | 0 | 87.7 | 63.5 | 0.5 | 76.3 | 43.9 | 0.5 | 3 | 5 | ○ | |
| | 14 | 54 nm | 0 | 87.3 | 63.2 | 0.5 | 75.9 | 43.6 | 0.5 | 3 | 5 | ○ | |
| | 15 | 60 nm | 0.1 | 87.1 | 62.8 | 0.5 | 75.7 | 43.2 | 0.5 | 3 | 5 | ○ | |
| | 16 | 55 nm | 0 | 87.6 | 62.7 | 0.5 | 76.2 | 43.1 | 0.5 | 3 | 5 | ○ | |
| | 17 | 55 nm | 0 | 87.6 | 63.5 | 0.5 | 76.2 | 43.9 | 0.5 | 3 | 5 | ○ | |
| | 18 | 58 nm | 0 | 87.3 | 63.3 | 0.5 | 75.9 | 43.7 | 0.5 | 3 | 5 | ○ | |
| | 19 | 60 nm | 0.1 | 87.4 | 63.2 | 0.5 | 76 | 43.6 | 0.5 | 3 | 5 | ○ | |
| | 20 | 52 nm | 0 | 87.5 | 63.2 | 0.5 | 76.1 | 43.6 | 0.5 | 3 | 5 | ○ | sulphate |
| | 21 | 46 nm | 0 | 87.6 | 63.4 | 0.4 | 76.2 | 43.8 | 0.4 | 3 | 5 | ○ | poly carbonate |
| | 22 | 55 nm | 0 | 87.8 | 62.9 | 0.5 | 76.4 | 43.3 | 0.5 | 3 | 5 | ○ | organic sulfonate |
| | 23 | 58 nm | 0.1 | 87.8 | 62.8 | 0.5 | 76.4 | 43.2 | 0.5 | 3 | 5 | ○ | polyester type |

The symbol "○" means "good".
※1) extruding machine in which two axes are equipped in parallel was used

TABLE 5

| | No. | addition amount of ITO | chelating agent | carboxylic acid | Others | Metal salt | Addition method chelating agent carboxylic acid | Solution average particle diameter in solution |
|---|---|---|---|---|---|---|---|---|
| Example | 24 | 1 | AC | — | — | Mg 2-ethylbutyrate | In ITO solution | 35 nm |
| | 25 | 1 | TAA | — | — | Mg 2-ethylbutyrate | In ITO solution | 34 nm |
| | 26 | 1 | — | acetic acid | — | Mg 2-ethylbutyrate | In ITO solution | 39 nm |
| | 27 | 1 | — | 2-ethyl butyric acid | — | Mg 2-ethylbutyrate | In ITO solution | 31 nm |
| | 28 | 1 | — | 2-ethyl hexanoic acid | — | Mg 2-ethylbutyrate | In ITO solution | 31 nm |
| | 29 | 1 | — | ricinoleic acid | — | Mg 2-ethylbutyrate | In ITO solution | 35 nm |
| | 30 | 1 | AC | acetic acid | — | Mg 2-ethylbutyrate | In ITO solution | 34 nm |
| | 31 | 1 | AC | 2-ethyl butyric acid | — | Mg 2-ethylbutyrate | In ITO solution | 31 nm |
| | 32 | 1 | AC | 2-ethyl hexanoic acid | — | Mg 2-ethylbutyrate | In ITO solution | 29 nm |
| | 33 | 1 | AC | ricinoleic acid | — | Mg 2-ethylbutyrate | In ITO solution | 35 nm |
| | 34 | 1 | AC | 2-ethyl butyric acid | — | Mg 2-ethylbutyrate | In ITO solution | 31 nm |
| | 35 | 1 | AC | 2-ethyl butyric acid | — | Mg acetate | In ITO solution | 31 nm |
| | 36 | 1 | AC | 2-ethyl butyric acid | — | K acetate/Mg 2-ethylbutyrate | In ITO solution | 31 nm |
| | 37 | 1 | AC | 2-ethyl butyric acid | — | Mg acetate/Mg 2-ethylbutyrate | In ITO solution | 29 nm |
| | 38 | 1 | AC | — | — | Mg 2-ethylbutyrate | In melt-kneading | 50 nm |
| | 39 | 1 | — | 2-ethyl butyric acid | — | Mg 2-ethylbutyrate | In melt-kneading | 50 nm |
| | 40 | 1 | — | 2-ethyl hexanoic acid | — | Mg 2-ethylbutyrate | In melt-kneading | 50 nm |
| | 41 | 1 | AC | 2-ethyl hexanoic acid | — | Mg 2-ethylbutyrate | In melt-kneading | 50 nm |
| | 42 | 1 | AC | 2-ethyl hexanoic acid | — | Mg 2-ethylbutyrate | In melt-kneading | 150 nm |
| | 43 | 1 | AC | 2-ethyl hexanoic acid | — | Mg 2-ethylbutyrate | In melt-kneading | 210 nm |
| | 44 | 1 | AC | 2-ethyl hexanoic acid | — | Mg 2-ethylbutyrate | In ITO solution | 31 nm |
| | 45 | 2 | AC | acetic acid | — | Mg 2-ethylbutyrate | In ITO solution | 34 nm |
| | 46 | 2 | AC | 2-ethyl butyric acid | — | Mg 2-ethylbutyrate | In ITO solution | 31 nm |
| | 47 | 2 | AC | 2-ethyl hexanoic acid | — | Mg 2-ethylbutyrate | In ITO solution | 29 nm |
| | 48 | 2 | AC | ricinoleic acid | — | Mg 2-ethylbutyrate | In ITO solution | 35 nm |

In Table 5,
AC represents acetylacetone,
TAA represents trifluoroacetylacetone,
K stands for potassium, and
Mg stands for magnesium.

TABLE 6

| | | | | Results | | | | | | | | |
|---|---|---|---|---|---|---|---|---|---|---|---|---|
| | | | | laminated clear glass | | | laminated heat absorption glass | | | | Pummel | |
| | No. | the average particle diameter in the flim | the number of particles with not less than 100 nm | a visible light trancemit-tance rate | a solar radiation trancemit-tance rate | Haze value | a visible light trancemit-tance rate | a solar radiation trancemt-tance rate | Haze value | Δ dB | value | evaluation | Remarks |
| Example | 24 | 61 nm | 0.1 | 83 | 55.6 | 0.6 | 75.1 | 39.5 | 0.6 | 3 | 5 | ○ | |
| | 25 | 63 nm | 0.3 | 83.2 | 55.3 | 0.7 | 75.2 | 39.4 | 0.7 | 3 | 5 | ○ | |
| | 26 | 63 nm | 0.2 | 83.1 | 55.2 | 0.6 | 75.6 | 39.8 | 0.6 | 3 | 5 | ○ | |
| | 27 | 60 nm | 0.1 | 82.9 | 55.7 | 0.6 | 75.3 | 39.6 | 0.6 | 3 | 5 | ○ | |
| | 28 | 60 nm | 0.1 | 83 | 55.6 | 0.6 | 75.1 | 39.5 | 0.6 | 3 | 5 | ○ | |
| | 29 | 61 nm | 0.2 | 83 | 55.6 | 0.6 | 75.1 | 39.6 | 0.6 | 3 | 5 | ○ | |
| | 30 | 63 nm | 0.3 | 83.5 | 55.3 | 0.6 | 75.5 | 39.8 | 0.6 | 3 | 5 | ○ | |
| | 31 | 53 nm | 0 | 83.3 | 55.1 | 0.5 | 75.4 | 39.3 | 0.5 | 3 | 5 | ○ | |
| | 32 | 51 nm | 0 | 83 | 55.3 | 0.5 | 75.2 | 39.3 | 0.5 | 3 | 5 | ○ | |
| | 33 | 55 nm | 0 | 83.2 | 55.4 | 0.5 | 75.2 | 39.5 | 0.5 | 3 | 5 | ○ | |
| | 34 | 49 nm | 0 | 83.1 | 55.5 | 0.4 | 75.3 | 39.9 | 0.4 | 3 | 5 | ○ | ※1) |
| | 35 | 58 nm | 0.1 | 83 | 55.6 | 0.5 | 75.1 | 39.5 | 0.5 | 3 | 5 | ○ | |
| | 36 | 57 nm | 0 | 83 | 55.6 | 0.5 | 75.1 | 39.6 | 0.5 | 3 | 5 | ○ | |
| | 37 | 59 nm | 0.1 | 82.8 | 55.2 | 0.6 | 75.3 | 39.4 | 0.6 | 3 | 5 | ○ | |
| | 38 | 65 nm | 0.3 | 83.6 | 55.6 | 0.7 | 75.6 | 39.6 | 0.7 | 3 | 5 | ○ | |
| | 39 | 60 nm | 0.1 | 83.1 | 55.3 | 0.6 | 75.8 | 39.1 | 0.6 | 3 | 5 | ○ | |
| | 40 | 60 nm | 0.1 | 83 | 55 | 0.5 | 75.1 | 39.5 | 0.5 | 3 | 5 | ○ | |
| | 41 | 63 nm | 0.2 | 83 | 54.9 | 0.6 | 75.2 | 39.1 | 0.6 | 3 | 5 | ○ | |
| | 42 | 60 nm | 0.1 | 83.2 | 55.2 | 0.6 | 75.6 | 39.7 | 0.6 | 3 | 5 | ○ | |
| | 43 | 75 nm | 0.5 | 83.1 | 55.4 | 0.8 | 75.5 | 39.2 | 0.8 | 3 | 5 | ○ | |
| | 44 | 52 nm | 0 | 86.1 | 60.1 | 0.4 | 75.1 | 38.9 | 0.4 | 3 | 5 | ○ | 0.4 mm film thickness |

TABLE 6-continued

| | | | laminated clear glass | | | laminated heat absorption glass | | | | | | |
|---|---|---|---|---|---|---|---|---|---|---|---|---|
| | | | | | | | | | | | Pummel | |
| No. | the average particle diameter in the flim | the number of particles with not less than 100 nm | a visible light trancemit- tance rate | a solar radiation trancemit- tance rate | Haze value | a visible light trancemit- tance rate | a solar radiation trancemt- tance rate | Haze value | Δ dB | value | evaluation | Remarks |
| 45 | 73 nm | 0.6 | 77.6 | 47.6 | 0.8 | 70.2 | 34.7 | 0.8 | 3 | 5 | ○ | |
| 46 | 68 nm | 0.5 | 77.5 | 47.5 | 0.7 | 70.5 | 34.3 | 0.7 | 3 | 5 | ○ | |
| 47 | 63 nm | 0.4 | 77.4 | 47.5 | 0.7 | 70.6 | 34.2 | 0.7 | 3 | 5 | ○ | |
| 48 | 70 nm | 0.5 | 77.6 | 47.6 | 0.8 | 70.8 | 34.5 | 0.8 | 3 | 5 | ○ | |

The symbol "○" means "good".
※1) extruding machine in which two axes are equipped in parallel was used

TABLE 7

| | | Contents | | | | | Addition method | Solution |
|---|---|---|---|---|---|---|---|---|
| | No. | addition amount of ITO | chelating agent | carboxylic acid | Others | Metal salt | chelating agent carboxylic acid | average particle diameter in solution |
| Comp. Ex. | 1 | 0 | — | — | — | Mg 2-ethylbutyrate | In ITO solution | — |
| | 2 | 0.05 | AC | 2-ethyl butyric acid | — | Mg 2-ethylbutyrate | In ITO solution | 31 nm |
| | 3 | 5 | AC | 2-ethyl butyric acid | — | Mg 2-ethylbutyrate | In ITO solution | 31 nm |
| | 4 | 5 | AC | 2-ethyl hexanoic acid | — | Mg 2-ethylbutyrate | In ITO solution | 29 nm |
| | 5 | 5 | AC | ricinoleic acid | — | Mg 2-ethylbutyrate | In ITO solution | 35 nm |
| | 6 | 0.3 | — | — | — | Mg 2-ethylbutyrate | In ITO solution | 35 nm |
| | 7 | 0.3 | — | — | carboxylic modified silicone | Mg 2-ethylbutyrate | In ITO solution | 37 nm |
| | 8 | 0.3 | — | — | — | Mg 2-ethylbutyrate | In ITO solution | 26 nm |
| | 9 | 1 | — | — | — | Mg 2-ethylbutyrate | In ITO solution | 32 nm |
| | 10 | 1 | — | — | — | Mg 2-ethylbutyrate | In ITO solution | 21 nm |
| | 11 | 2 | — | — | — | Mg 2-ethylbutyrate | In ITO solution | 32 nm |
| | 12 | heat reflection glass | | | — | | | |
| | 13 | heat reflection PET | | | — | | | |

In Table 7, AC represents acetylacetone, Mg stands for magnesium, heat reflection glass means heat reflection glass sheet, and heat reflection PET means heat reflection polyethylene telephthalate.

TABLE 8

| | | | | laminated clear glass | | | laminated heat absoption glass | | | | Pummel | |
|---|---|---|---|---|---|---|---|---|---|---|---|---|
| | No. | the average particle diameter in the film | the number of particles with not less than 100 nm | a visible light trancemit- tance rate | a solar radiation trancemit- tance rate | Haze value | a visible light trancemit- tance rate | a solar radiation trancemt- tance rate | Haze value | Δ dB | value | evaluation |
| Comp. Example | 1 | — | — | 89 | 80.2 | 0.5 | — | — | — | 3 | 5 | ○ |
| | 2 | 58 nm | 0 | 88.1 | 73.4 | 0.5 | — | — | — | 3 | 5 | ○ |
| | 3 | 102 nm | 3 | 66.1 | 31.2 | 1.3 | — | — | — | 3 | 5 | ○ |
| | 4 | 103 nm | 3 | 66.2 | 31.6 | 1.3 | — | — | — | 3 | 5 | ○ |
| | 5 | 110 nm | 8 | 66 | 31.3 | 1.5 | — | — | — | 3 | 5 | ○ |
| | 6 | 85 nm | 2 | 87.3 | 63.2 | 1.2 | — | — | — | 3 | 5 | ○ |
| | 7 | 85 nm | 2 | 87.3 | 63.3 | 1.2 | — | — | — | 3 | 0 | X |
| | 8 | 90 nm | 1 | 87.3 | 63.2 | 1.2 | — | — | — | 3 | 5 | ○ |
| | 9 | 103 nm | 5 | 82 | 54.5 | 1.7 | — | — | — | 3 | 5 | ○ |
| | 10 | 75 nm | 3 | 81.9 | 54.9 | 1.7 | — | — | — | 3 | 5 | ○ |
| | 11 | 130 nm | 9 | 77.6 | 47.6 | 2.1 | — | — | — | 3 | 5 | ○ |
| | 12 | — | — | 74.7 | 41.9 | 0.4 | — | — | — | 37 | 5 | ○ |
| | 13 | — | — | 71.1 | 39.9 | 0.4 | — | — | — | 48 | 5 | ○ |

The symbols "○" and "X" mean "good" and "bad" respectively.

EXAMPLE 49

(Synthesis of Polyvinylbutyral Resin)

To 2890 g of deionized water, 275 g of polyvinyl alcohol with an average polymerization degree of 1700 and a saponification degree of 99.2 mole % was added, and the mixture was heated for dissolving. After the mixture was cooled to 15° C., 201 g of 35 weight % hydrochloric acid and 157 g of n-butyraldehyde were added, and the reaction mixture was maintained at this temperature to precipitate the reaction product.

Thereafeter, the liquid temperature was raised to 60° C. and maintained at this level for 3 hours to complete the reaction. Then, the reaction mixture was washed with an excessive amount of water for washing away unreacted n-butyraldehyde, neutralized with sodium hydroxide, which is the common neutralizing agent, washed with an excessive amount of water for 2 hours and dried to provide polyvinyl butyral resin with a butyralization degree of 68.5 mole % as white powder.

(Preparation of Dispersion)

To 3GO solution containing 5 weight % of ITO particles wherein a commercially available phosphoric acid ester salt was used as a dispersant to be 0.5 weight % in the plasticizing solution, 2-ethylhexanoic acid was added 10 parts by weight per 100 parts by weight of ITO, and the mixture was stirred thoroughly. The heating stability of ITO particles in the obtained 3GO solution was evaluated by the method (1) as follows, and the results were shown in table 9.

(Production of an Interlayer Film for Laminated Glass and a Laminated Glass)

To 100 parts by weight of polyvinylbutyral resin thus obtained, 41 parts by weight of 3GO solution was added. The mixture was thoroughly melt-kneaded with a mixing roll and press-molded with a pressing machine at 150° C. for 30 minutes to provide an interlayer film for laminated glass having an average thickness of 0.8 mm. The obtained interlayer film was interposed between two float sheet glasses having the thickness of 2.4 mm thickness and prebonded by Roll method. The prebonded laminated glass thus obtained was subjected to post-bonding in an autoclave at 140° C. and 1.2 MPa to provide a laminated glass. The laminated glass thus obtained was measured by the method (2) and (3) as follows, and the results were shown in table 9.

(1) The Measurement of Particle Size Distribution

The particle size distribution of ITO particles in 3GO solution was measured by Microtrac UPA particle size analyzer produced by Nikkiso Co., Ltd. The measurement was first carried out at room temperature, then the second measurement was carried out after heating 3GO solution up to 200° C. and cooling to the room temperature.

(2) Optical Characteristics

A visible light transmittance rate (Tv) in the light rays of 380 to 780 nm and a solar radiation transmittance rate (Ts) in the light rays of 300 to 2500 nm were measured by the same method described above.

(3) The Haze Value (H)

The haze value was measured according to a method stipulated in JIS K 6714.

COMPARATIVE EXAMPLE 14

A resin film was prepared and evaluated as in Example 49 except that 2-ethylhexanoic acid was not used. The results were shown in table 9.

TABLE 9

|  |  | Visible light transmittance rate (Tv) | Solar radiation transmittance rate (Ts) | Haze value (H) | Average particle diameter (nm) | |
|---|---|---|---|---|---|---|
|  |  |  |  |  | Room temperature | After heating |
| Example | 49 | 78 | 48 | 0.6 | 25 | 27 |
| Comparative Example | 14 | 78 | 48 | 1.3 | 47 | Cohesion and Precipitation |

EXAMPLE 50

(1) Synthesis of Polyvinyl Acetal Resin

To a reactor equipped with a stirring device, 2890 g of deionized water, 275 g of polyvinyl alcohol with an average polymerization degree of 1700 and a saponification degree of 99.2 mole % were added, and the mixture was heated for dissolving. After the mixture was cooled to 15° C., 201 g of 35 weight % hydrochloric acid and 157 g of n-butyraldehyde were added, and the reaction system was maintained at this temperature to precipitate the reaction product.

Thereafeter, the liquid temperature was raised to 60° C. and maintained at this level for 3 hours to complete the reaction. Then, the reaction mixture was washed with an excessive amount of water for washing away unreacted n-butyraldehyde, neutralized hydrochloric acid catalyst with sodium hydroxide as a neutralizing agent, washed with an excessive amount of water for 2 hours and dried to provide polyvinyl butyral resin as white powder. The obtained polyvinyl butyral resin had a butyralization degree of 68.5 mole %.

(2) Preparation of Tin-Doped Indium Oxide (ITO) Dispersion in Plasticizer.

By using triethylene glycol di-2-ethylhexanoate (3GO) as the plasticizer, ITO powder was added to be 1.4 weight % to 3GO, and ITO was dispersed into the mixture by Attritor for 10 hours to prepare in ITO dispersion of 3GO. As for the particle diameter of ITO in the obtained dispersion, the minimum particle diameter was 11 nm, the maximum particle diameter of 60 nm, and weight conversion average particle diameter of 20 nm.

The particle diameter of ITO was measured with the light scattering analyzer ("DLS-6000AL" (trade name), produced by OTSUKA ELECTRONICS CO., LTD), and by Dynamic Light Scattering method by using Ar lazer as light source.

(3) Production of an Interlayer Film for Laminated Glass

To 100 parts by weight of polyvinyl butyral resin obtained in (1), 40 parts by weight of ITO dispersion of 3GO obtained in (2) was added. The mixture was thoroughly melt-kneaded with a mixing roll and press-molded with a press-molding machine at 150° C. for 30 minutes to provide an interlayer film for laminated glass having an average thickness of 0.76 mm.

(4) Production of a Laminated Glass

The interlayer film obtained in (3) was cut into 300 mm×300 mm, and was interposed between two float sheet glasses (300 mm×300 mm×3 mm thickness) and the assembly was placed in a vacuum bag (a rubber bag) and deaerated under a vacuum of 2.7 kPa (20 Torr) for 20 minutes. The deaerated assembly was transferred to an oven under suction and pressed under vacuum at 90° C. for 30 minutes. The prebonded laminated glass thus obtained was subjected to post-bonding in an autoclave at 150° C. and 1.3 MPa (13 kg/cm$^2$) to provide a laminated glass.

EXAMPLE 51

An interlayer film for laminated glass and a laminated glass were prepared as in Example 50 except that ITO has the minimum particle diameter of 15 nm, the maximum particle diameter of 80 nm, and weight conversion average particle diameter of 30 nm in the preparation of ITO dispersion in plasticizer.

EXAMPLE 52

An interlayer film for laminated glass and a laminated glass were prepared as in Example 50 except that ITO having the minimum particle diameter of 13 nm, the maximum particle diameter of 75 nm, and weight conversion average particle diameter of 25 nm was added to be 2.5 weight % in 3GO (plasticizer) in the preparation of ITO dispersion in plasticizer.

EXAMPLE 53

An interlayer film for laminated glass and a laminated glass were prepared as in Example 50 except that ITO was dispersed for 5 hours by an Attritor mill, and ITO has the minimum particle diameter of 30 nm, the maximum particle diameter of 100 nm, and weight conversion average particle diameter of 50 nm in the preparation of ITO dispersion in plasticizer.

COMPARATIVE EXAMPLE 15

An interlayer film for laminated glass and a laminated glass were prepared as in Example 50 except that ITO dispersion in plasticizer was not prepared preliminary, and ITO was added directly to be 0.4 weight % in an interlayer film to polyvinyl butyral resin. As the ITO particle diameter in the obtained interlayer film was observed with a transmission electron microscope, it was found that the minimum particle diameter was 10 nm, the maximum particle diameter was 30 nm, and the average particle diameter was 15 nm.

The characteristics of five laminated glass sheets prepared in Examples 50 to 53 and Comparative Example 15 were measured by the above-mentioned methods. The characteristics were ① a visible light transmittance rate (Tv) in the light rays of 380 to 780 nm, ② a solar radiation transmittance rate (Ts) in the light rays of 300 to 2500 nm, ③ the haze value (H) in the light rays of 340 to 1800 nm, and ④ the electromagnetic wave shield (ΔdB) in the wavelength of 10 to 2000 MHz. The results were shown in table 10.

TABLE 10

| | | | Example | | | | Comparative Example |
|---|---|---|---|---|---|---|---|
| | | | 50 | 51 | 52 | 53 | 15 |
| An interlayer film for laminated glass | Addition method of ITO | Dispersion in plasticizer | ○ | ○ | ○ | ○ | |
| | | Direct addtion to PVB | | | | | ○ |
| | Particle diameter of ITO (nm) | The minimum particle diamter | 11 | 15 | 13 | 30 | 10 |
| | | The maximum particle diameter | 60 | 80 | 75 | 100 | 30 |
| | | The average particle diameter | 20 | 30 | 25 | 50 | 15 |
| Characterristics of a laminated glass | A visible light transmittance rate (Tv: %) | | 85 | 85 | 83 | 84 | 81 |
| | A solar radiation transmittance rate (Ts: %) | | 59 | 59 | 55 | 59 | 58 |
| | Haze value (H: %) | | 0.4 | 0.6 | 0.6 | 1.0 | 3.5 |
| | Electromagnetic wave shield (ΔdB:dB) | Electric field | 1 | 1 | 1 | 1 | 1 |
| | | Magnetic field | 1 | 1 | 1 | 1 | 1 |

The symbol "○" means "employed".

EXAMPLE 54

(1) Synthesis of Polyvinylbutyral Resin

To 2890 g of deionized water, 275 g of polyvinyl acetal with an average polymerization degree of 1700 and a saponification degree of 99.2 mole % was added, and the mixture was heated for dissolving. After the mixture was cooled to 15° C., 201 g of 35 weight % hydrochloric acid and 157 g of n-butyraldehyde were added, and the reaction mixture was maintained at this temperature to precipitate the reaction product. Thereafeter, the liquid temperature was raised to 60° C. and maintained at this level for 3 hours to complete the reaction. Then, the reaction mixture was washed with an excessive amount of water for washing away unreacted n-butyraldehyde, neutralized hydrochloric acid catalyst with sodium hydroxide, washed with an excessive amount of water for 2 hours and dried to provide polyvinyl butyral resin as white powder with a butyralization degree of 68.5 mole %.

(2) Preparation of Metal Particles Dispersion

The tin-doped indium oxide powder was added to 3GO to be 10 weight %. In addition to the mixture, as the dispersant, polyvinyl butyral resin powder with butyralization degree of 65.3 mole %, which was synthesized from polyvinyl acetal with an average polymerization degree of 1700 and a saponification degree of 99.2 mole %, was subjected to Attritor to be 50 parts by weight per 100 parts by weight of the tin-doped indium oxide, and the resultant mixture was dispersed with Attritor for 10 hours to prepare the metal particles dispersion.

(3) Production of an Interlayer Film

To 100 parts by weight of polyvinyl butyral resin obtained thus above, 39 parts by weight of 3GO wherein 1.0 part by weight of tin-doped indium oxide was dispersed, 20 ppm of magnesium acetate, and 40 ppm of magnesium 2-ethylbutyrate were added. The mixture was thoroughly melt-kneaded with a mixing roll and press-molded with a press-molding machine at 150° C. for 30 minutes to provide an interlayer film having an average thickness of 0.76 mm.

(4) Production of a Laminated Glass

The thus obtained interlayer film was interposed between two transparent float sheet glasses (30 cm×30 cm×3 mm thickness) and the assembly was placed in a rubber bag and deaerated under a vacuum of 2.7 kPa for 20 minutes. The deaerated assembly was transferred to an oven under suction and pressed under vacuum at 90° C. for 30 minutes. The prebonded laminated glass thus obtained was subjected to post-bonding in an autoclave at 135° C. and 1.2 MPa for 20 minutes to provide a laminated glass.

(5) Performance Evaluation

As for the characteristics of the laminated glass thus obtained in (4), the optical characteristics, the haze, the electromagnetic wave transmittance, and pummel value were measured by the above-mentioned methods. The results were shown in table 11.

[Exfoliation after Humidity Resistance Test]

After the laminated glass is left standing at a temperature of 80° C. and the relative humidity of 95% for 2 weeks, and whether the exfoliation at the ends of the laminated glass occur was observed immediately after taking out from the condition. The results were shown in table 11.

EXAMPLE 55

A laminated glass was prepared as in Example 54 except that 1.0 part by weight of antimony-doped tin oxide was used instead of 1.0 part by weight of tin-doped indium oxide in the preparation of an interlayer film.

EXAMPLE 56

A laminated glass was prepared as in Example 54 except that tin-doped indium oxide was added 1.6 parts by weight in the preparation of an interlayer film.

EXAMPLE 57

A laminated glass was prepared as in Example 54 except that tin-doped indium oxide was added 2.8 parts by weight in the preparation of an interlayer film.

EXAMPLE 58

A laminated glass was prepared as in Example 54 except that 10 parts by weight of carboxylic modified silicone oil was used instead of 50 parts by weight of polyvinyl butyral resin powder as a dispersant per 100 parts by weight of tin-doped indium oxide in the preparation of the metal particles dispersion.

COMPARATIVE EXAMPLE 16

A laminated glass was prepared as in Example 54 except that tin-doped indium oxide was not added in the preparation of an interlayer film.

COMPARATIVE EXAMPLE 17

A laminated glass was prepared as in Example 54 except that an interlayer film was produced without adding tin-doped indium oxide and that the glass obtained by sputtering tin-doped indium oxide on the glass surface was used instead of the transparent float sheet glass.

COMPARATIVE EXAMPLE 18

A laminated glass was prepared as in Example 54 except that an interlayer film having the thickness of 0.38 mm was produced without adding tin-doped indium oxide, and that polyester film with thickness of 50 μm obtained by sputtering tin-doped indium oxide on the film surface was interposed between the two sheets of the obtained interlayer film.

COMPARATIVE EXAMPLE 19

A laminated glass was prepared as in Example 54 except that tin-doped indium oxide was added 0.03 part by weight in the preparation of an interlayer film.

COMPARATIVE EXAMPLE 20

A laminated glass was prepared as in Example 54 except that tin-doped indium oxide was added 3.6 parts by weight in the preparation of an interlayer film.

The characteristics of the laminated glass sheets prepared in Examples 54 to 58, and Comparative Examples 16 to 20 were evaluated in the similar manner to Example 54. The results were shown in table 11.

TABLE 11

| | | Tv | Ts | H | ΔdBmax Electric field | ΔdBmax Magnetic field | Pummel value | Exfoliation after humidity resistance test |
|---|---|---|---|---|---|---|---|---|
| Example | 54 | 83 | 55 | 0.8 | 1 | 1 | 4 | No exfoliation |
| | 55 | 83 | 57 | 0.8 | 1 | 1 | 4 | No exfoliation |
| | 56 | 80 | 48 | 0.6 | 1 | 1 | 4 | No exfoliation |
| | 57 | 76 | 45 | 0.9 | 1 | 1 | 4 | No exfoliation |
| | 58 | 83 | 55 | 0.8 | 1 | 1 | 4 | No exfoliation |
| Comparative Example | 16 | 89 | 80 | 0.4 | 1 | 1 | 4 | No exfoliation |
| | 17 | 80 | 48 | 0.7 | 50 | 20 | 1 | Exfoliation |
| | 18 | 80 | 48 | 0.7 | 50 | 20 | 1 | PET/Exfoliation among films |
| | 19 | 88 | 74 | 0.6 | 1 | 1 | 4 | No exfoliation |
| | 20 | 70 | 36 | 2.0 | 1 | 1 | 4 | No exfoliation |

INDUSTRIAL APPLICABILITY

The present invention provides an interlayer film with excellent heat insulation, because of containing tin-doped indium oxide or antimony-doped tin oxide with excellent infrared ray (heat ray) cutting function.

Also, by adding and dispersing tin-doped indium oxide or antimony-doped tin oxide having the average particle diameter within the designated range, the present invention provides an interlayer film suitable for producing a laminated glass, which exert excellent heat insulation and transparency.

Moreover, this invention provides an interlayer film suitable for producing a laminated glass, which has excellent fundamental performance characteristics required for a laminated glass, for example, appropriate bond strength between an interlayer film and the glass, penetration resistance, impact absorption, weather resistance, and so on.

The interlayer film of the present invention does not need a complicated multi-layer coating or a protective film, so it is suitable for producing a laminated glass, which has excellent electromagnetic wave transmittance and transparency, and can be produced at low production cost.

The laminated glass of the present invention can be produced by using the above-mentioned interlayer film of the present invention, so the obtained laminated glass exerts excellent heat insulation and electromagnetic wave transmittance, and also has excellent fundamental performance characteristics required for a laminated glass, for example, transparency, appropriate bond strength between an interlayer film and glass, penetration resistance, impact absorption, weather resistance, and so on. Moreover, the blushing by absorbing moisture will not easily occur.

Especially, a visible light transmittance rate (Tv) in the light rays of 380 to 780 nm being not less than the specific value, and a solar radiation transmittance rate (Ts) in the light rays of 300 to 2500 nm, the haze value (H), and electromagnetic wave shield (ΔdB) in the wavelength of 10 to 2000 MHz being not more than the specific value, the above-mentioned heat insulation, transparency and electromagnetic wave transmittance of the present invention are remarkably excellent.

Thus, the laminated glass of the present invention can be preferably used as automotive windshields or side-glasses, or architectural window glasses, and so on.

The invention claimed is:

1. An interlayer film for laminated glass, which comprises an adhesive resin containing a plasticizer, and tin-doped indium oxide and/or antimony-doped tin oxide particles with an average particle diameter of not more than 80 nm which are dispersed in the adhesive resin, and a dispersant selected from the group consisting of;
   (a) a chelating agent,
   (b) a compound with at least one carboxyl group at its terminal position,
   (c) a carboxyl modified silicone oil,
   (d) a sulfate compound, and
   (e) a polyalcohol surfactant,
   wherein the number of tin-doped indium oxide and/or antimony-doped tin oxide particles with a particle diameter of not less than 100 nm is not more than 1 per 1 μm².

2. An interlayer film for laminated glass as claimed in claim 1, wherein the plasticizer is a member selected from the group consisting of monobasic acid esters, polybasic acid esters, organic phosphoric acids, organic phosphorus acids and a mixture thereof.

3. An interlayer film for laminated glass as claimed in claim 1, wherein 30 to 60 parts by weight of the plasticizer, 0.1 to 3.0 parts by weight of tin-doped indium oxide and/or antimony-doped tin oxide are contained per 100 parts by weight of the adhesive resin.

4. An interlayer film for laminated glass as claimed in claim 1, wherein the adhesive resin is polyvinylacetal resin.

5. An interlayer film for laminated glass according to claim 1, wherein the dispersant is a chelating agent.

6. An interlayer film for laminated glass as claimed in claim 1, wherein the chelating agent is a β diketone compound.

7. An interlayer film for laminated glass as claimed in claim 6, wherein the β diketone compound is acetylacetone.

8. An interlayer film for laminated glass as claimed in claim 1, wherein the compound with at least one carboxyl group and its terminal position is at least one member selected from the group consisting of:
   (a) an aliphatic carboxylic acid having 2 to 18 carbon atoms, and
   (b) a hydroxy carboxylic acid having 2 to 18 carbon atoms.

9. An interlayer film for laminated glass as claimed in claim 8, wherein the aliphatic carboxylic acid having 2 to 18 carbon atoms is 2-ethylbutyric acid or 2-ethylhexanoic acid.

10. An interlayer film for laminated glass as claimed in claim 1, wherein the adhesive resin contains a bond adjusting agent.

11. An interlayer film for laminated glass as claimed in claim 10, wherein the bond adjusting agent is a magnesium and/or potassium salt of a carboxylic acid having 2 to 10 carbon atoms.

12. An interlayer film for laminated glass as claimed in claim 11, wherein the amount of the magnesium and/or potassium salt of the carboxylic acid having 2 to 10 carbon atoms is 10 to 150 ppm as magnesium and/or potassium content in the obtained interlayer film.

13. A laminated glass, which is prepared by interposing an interlayer film for laminated glass as claimed in claim 1 between at least a pair of glass sheets to integrate the interlayer film and the laminated glass sheets.

14. A laminated glass as claimed in claim 13, which has a visible light transmittance rate (Tv) to light rays of 380 to 780 nm, a solar radiation transmittance rate (Ts) to light rays of 300 to 2500 nm and a haze value (H) as follows:

Tv≧65%
Ts≦0.8×Tv
H≦1.0%.

15. A laminated glass as claimed in claim 13, wherein the laminated glass has an efficiency of electromagnetic wave shield ΔdB in the wavelength of 10 to 2000 MHz of not more than 10 dB.

16. A laminated glass as claimed in claim 13, wherein the laminated glass has a visible light transmittance rate (Tv) to light rays of 380 to 780 nm, a solar radiation transmittance rate (Ts) to light rays of 300 to 2500 nm, a haze value (H), an efficiency of electromagnetic wave shield (ΔdB) in the wavelength of 10 to 2000 MHz and a pummel value (P) as follows:

Tv≧75%
Ts≦0.8×Tv
H≦1.0%.
ΔdB≦10 dB
P=a numeral from 3 to 7.

17. A laminated glass as claimed in claim 13, wherein the plasticizer is a member selected from the group consisting of monobasic acid esters, polybasic acid esters, organic phosphoric acids, organic phosphorus acids and a mixture thereof.

18. A laminated glass as claimed in claim 13, wherein 30 to 60 parts by weight of the plasticizer and 0.1 to 3.0 parts by weight of tin-doped indium oxide and/or antimony-doped tin oxide are contained per 100 parts by weight of the adhesive resin.

19. A laminated glass as claimed in claim 13, wherein the adhesive resin is polyvinylacetal resin.

20. A laminated glass as claimed in claim 13, wherein at least one of the pair of glass sheets interposing the interlayer film is a heat-ray absorption glass which has a visible light transmittance rate of not less than 75% to light rays of 380 to 780 nm and a solar radiation transmittance rate of not more than 65% to light rays of 900 to 1300 nm.

21. A laminated glass as claimed in claim 20, wherein the heat-ray absorption glass is a green glass.

22. A laminated glass as claimed in claim 13, wherein the chelating agent is a β diketone compound.

23. A laminated glass as claimed in claim 22, wherein the β diketone compound is acetylacetone.

24. A laminated glass as claimed in claim 13, wherein the compound with at least one carboxyl group at its terminal position is at least one member selected from the group consisting of:

(a) an aliphatic carboxylic acid having 2 to 18 carbon atoms, and (b) a hydroxy carboxylic acid having 2 to 18 carbon atoms.

25. A laminated glass as claimed in claim 24, wherein the aliphatic carboxylic acid having 2 to 18 carbon atoms is 2-ethylbutyric acid or 2-ethylhexanoic acid.

26. A laminated glass as claimed in claim 13, wherein the adhesive resin contains a bond adjusting agent.

27. A laminated glass as claimed in claim 26, wherein the bond adjusting agent is a magnesium and/or potassium salt of a carboxylic acid having 2 to 10 carbon atoms.

28. A laminated glass as claimed in claim 27, wherein the amount of the magnesium and/or potassium salt of the carboxylic acid having 2 to 10 carbon atoms is 10 to 150 ppm as magnesium and/or potassium content in the obtained interlayer film.

* * * * *